United States Patent
Stratton et al.

(10) Patent No.: US 12,216,380 B2
(45) Date of Patent: Feb. 4, 2025

(54) GRADIENT-INDEX LIQUID CRYSTAL LENS HAVING A PLURALITY OF INDEPENDENTLY-OPERABLE DRIVING ZONES

(71) Applicant: Meta Platforms Technologies, LLC, Menlo Park, CA (US)

(72) Inventors: Eric Stratton, Redmond, WA (US); Amit Bhowmick, Kent, OH (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/188,923

(22) Filed: Mar. 23, 2023

(65) Prior Publication Data

US 2024/0094594 A1    Mar. 21, 2024

Related U.S. Application Data

(60) Provisional application No. 63/407,455, filed on Sep. 16, 2022.

(51) Int. Cl.
| | |
|---|---|
| G02F 1/29 | (2006.01) |
| G02B 27/01 | (2006.01) |
| G06F 3/01 | (2006.01) |
| G09G 3/00 | (2006.01) |

(52) U.S. Cl.
CPC ......... *G02F 1/294* (2021.01); *G02B 27/0172* (2013.01); *G02B 27/0179* (2013.01); *G06F 3/013* (2013.01); *G09G 3/003* (2013.01); *G02B 2027/0123* (2013.01); *G02B 2027/0178* (2013.01); *G02B 2027/0187* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2017/0336637 A1* | 11/2017 | Van Heugten | G02B 27/16 |
| 2019/0086741 A1* | 3/2019 | Milton | G02F 1/134309 |
| 2021/0389641 A1* | 12/2021 | Heugten | G02F 1/1343 |

* cited by examiner

*Primary Examiner* — Andre L Matthews
(74) *Attorney, Agent, or Firm* — Greenberg Traurig, LLP

(57) ABSTRACT

A lens system may include a lens having a liquid crystal layer and a driving electrode array disposed on a first side of the liquid crystal layer, the driving electrode array including a plurality of driving zones that are independently operable. The plurality of driving zones may each include a plurality of driving electrodes consecutively arranged along a radial direction extending from a central region of the lens. The lens system may include a controller that is configured to independently operate each of the plurality of driving zones via a separate plurality of bus lines coupled to each of the plurality of driving zones. The controller may be configured to operate at least one of the driving zones based on a gaze direction of the user. Various other devices, systems, and methods are also disclosed.

20 Claims, 17 Drawing Sheets

GRADIENT-INDEX LIQUID CRYSTAL LENS HAVING A PLURALITY OF INDEPENDENTLY-OPERABLE DRIVING ZONES

CROSS-REFERENCE TO RELATED APPLICATIONS

This application claims the benefit of and priority to U.S. Provisional Patent Application No. 63/407,455, filed 16 Sep. 2022, and titled GRADIENT-INDEX LIQUID CRYSTAL LENS HAVING A PLURALITY OF INDEPENDENTLY-OPERABLE DRIVING ZONES, the disclosure of which is incorporated, in its entirety, by this reference

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
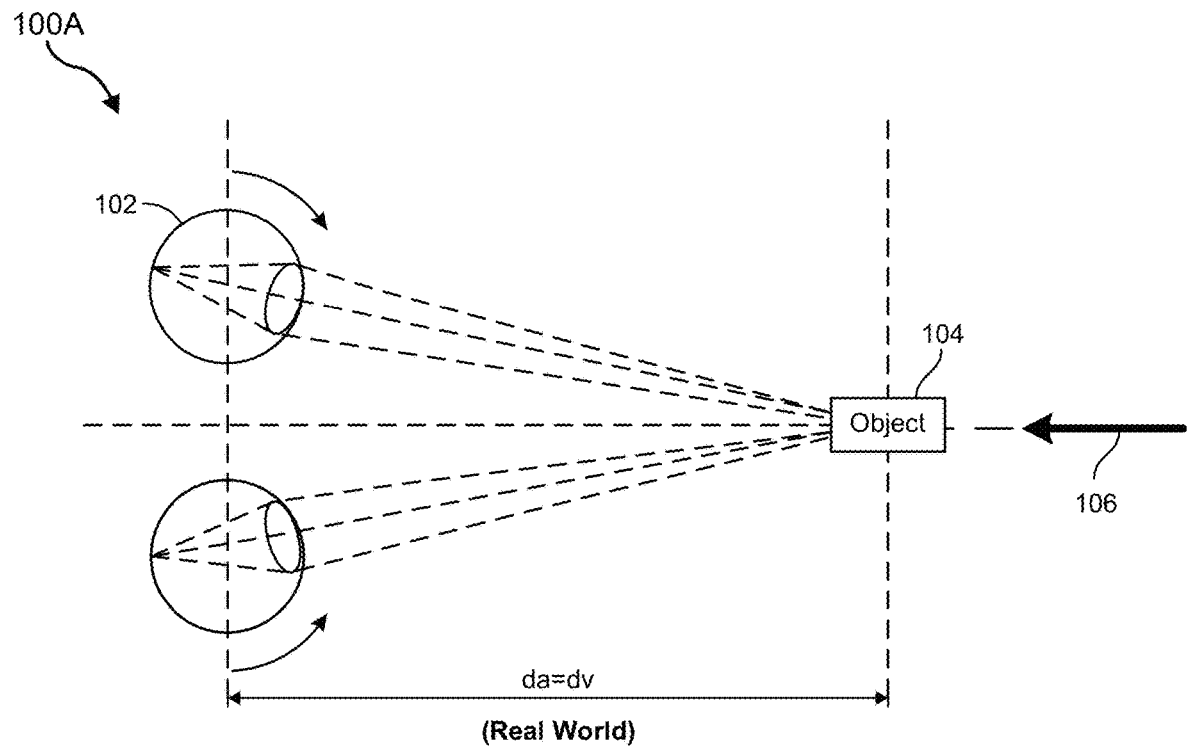
FIG. 1A illustrates a relationship between vergence and accommodation in the real world according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality devices, such as virtual reality headsets, can be used to simulate and/or reproduce a variety of virtual and remote environments. For example, stereoscopic images can be displayed on an electronic display inside a headset to simulate the illusion of depth, and head tracking sensors can be used to estimate what portion of the virtual environment is being viewed by the user. However, because existing headsets are often unable to correctly render or otherwise compensate for vergence and accommodation conflicts, such simulation can cause visual fatigue and discomfort for the users. Augmented reality and mixed reality headsets may display a virtual image overlapping with real-world images. To create a comfortable viewing experience, virtual images generated by such headsets are typically displayed at distances suitable for eye accommodations of real-world images in real time during the viewing process.

Vergence-accommodation conflict is a common problem in artificial reality systems, including virtual, augmented, and mixed reality systems. "Accommodation" is a process of adjusting the focal length of an eye lens. During accommodation, the optics of an eye are adjusted to keep an object in focus on the retina as its distance from the eye varies. "Vergence" is the simultaneous movement or rotation of both eyes in opposite directions to obtain or maintain binocular vision and is connected to accommodation of the eye. Under normal conditions, when human eyes look at a new object at a distance different from an object they had been looking at, the eyes automatically change focus (by changing their shape) to provide accommodation at the new distance or vergence distance of the new object.

In accordance with various embodiments, disclosed display devices may include gradient-index liquid crystal (GRIN LC) lenses that utilize variations in liquid crystal alignment to refract light in a manner similar to conventional lenses. A GRIN LC lens, as disclosed herein, may include an electrode array that provides variations in voltages applied to a liquid crystal layer of the lens, with the variations producing a voltage gradient(s) proceeding from a center of the lens outward. Voltages applied to the liquid crystal layer may be selectively changed so as to generate different lens powers corresponding to active display conditions and/or user eye orientation. Accordingly, GRIN LC lenses, as disclosed herein, may address the vergence-accommodation conflict by compelling a user's eyes to focus at a focal distance coinciding with a vergence location of a virtual object displayed by the display device. Moreover, since the lens diopter is not determined solely by a surface shape of the GRIN LC lens, the thickness of the disclosed GRIN LC lenses may be significantly reduced in comparison to conventional lenses.

In some examples, an aperture of the GRIN LC lens may be partitioned into multiple zones covering different portions of the lens. The zones may be electrically separated from each other so that they can be selectively activated by a controller. For example, one or more zones aligned with a user's gaze direction may be activated while other zones are deactivated or maintained in a previous state. The display device may include an eye-tracking system to detect a gaze direction for each of a user's eyes. By activating selected positional zones of the lens, rather than activating the entire lens area all at one, a response time of a foveal region of the lens may be substantially reduced. Accordingly, changes in the lens shape may be less noticeable to a user during transitions in lens focus. Additionally, the discretely partitioned zones may enable manufacturing of GRIN LC lenses having increased diameters.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-20, a detailed description of GRIN LC lenses and systems. The discussion associated with FIGS. 1-18 relates to the architecture, operation, and manufacturing of various example GRIN LC lenses and systems. The discussion associated with FIGS. 19 and 20 relates to exemplary virtual reality and augmented reality devices that may include GRIN LC lenses as disclosed herein.

FIG. 1A shows a diagram 100A illustrating an example of how the human eye experiences vergence and accommodation in the real world. As shown in FIG. 1A, a user is looking at a real object 104 such that the user's eyes 102 are verged on real object 104 and gaze lines from the user's eyes 102 intersect at real object 104. As real object 104 is moved closer to the user's eyes 102 (as indicated by arrow 106), each eye 102 rotates inward (i.e., convergence) to stay verged on real object 104. As real object 104 gets closer, the user's eyes 102 accommodate for the closer distance by changing their shape to reduce the power or focal length. The distance at which the eyes 102 must be focused to create a sharp retinal image is the accommodation distance. Thus, under normal conditions in the real world, the vergence distance (dv) is equal to the accommodation distance (da).

Figure 1B:
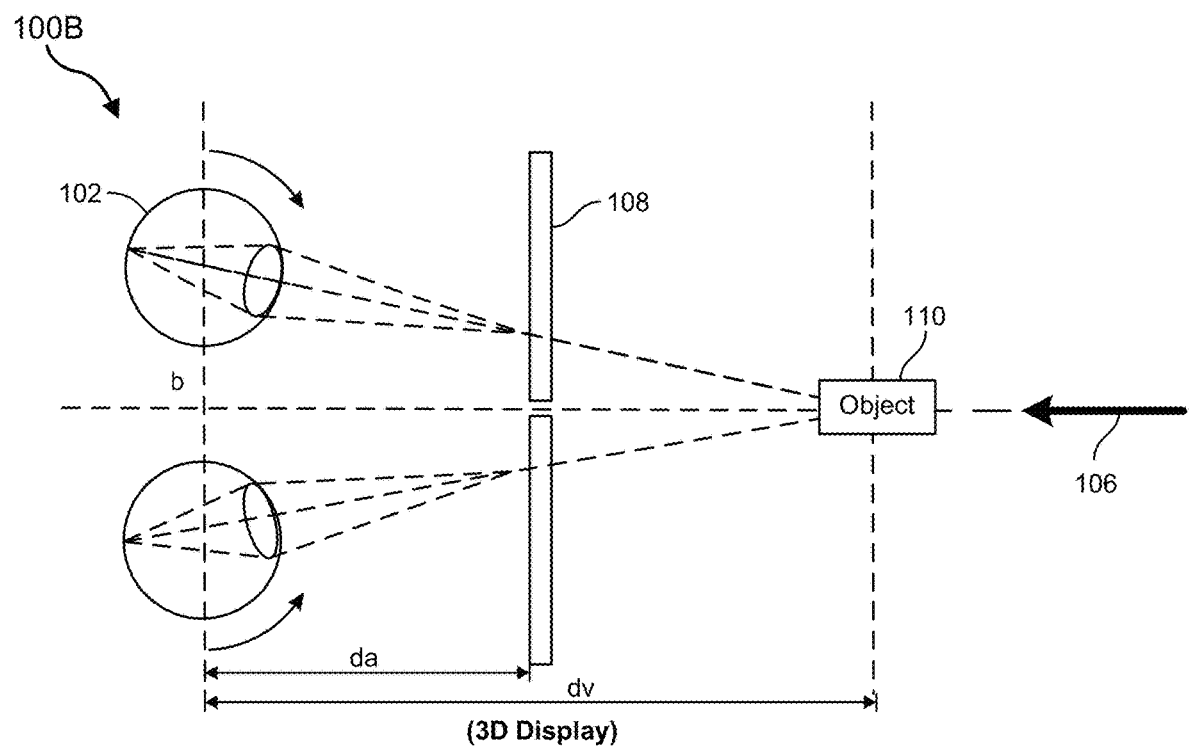
FIG. 1B illustrates a conflict between vergence and accommodation in a three-dimensional (3D) display screen according to some embodiments.

FIG. 1B shows a diagram 100B illustrating an example conflict between vergence and accommodation that can occur with conventional three-dimensional displays. As shown in FIG. 1B, a user is looking at a virtual object 110 displayed on an electronic screen(s) 108. The user's eyes 102 are verged on virtual object 110 (gaze lines from the user's eyes 102 are shown intersecting at virtual object 110). However, virtual object 110 is located at a greater distance from the user's eyes 102 than electronic screen(s) 108. As virtual object 110 is rendered on the electronic screen(s) 108 to appear closer to the user, each eye 102 again rotates inward to stay verged on virtual object 110, but the power or focal length of each eye 102 is not reduced. Hence, the user's eyes may not accommodate in the manner illustrated in FIG. 1A. Accordingly, instead of reducing power or focal length to accommodate for the closer vergence distance associated with virtual object 110, each eye 102 maintains accommodation at a distance associated with the electronic screen 108. Thus, the vergence distance dv may not be equal to the accommodation distance da for the human eye for objects displayed on 2-dimensional electronic screens. This discrepancy between vergence distance dv and accommodation distance da is commonly referred to as "vergence-accommodation conflict." A user experiencing only vergence or accommodation, but not both simultaneously, with respect to a virtual object may undesirably experience eye fatigue and discomfort during use.

"Optical series," as used herein, may refer to relative positioning of a plurality of optical elements such that light, for each optical element of the plurality of optical elements, is transmitted by that optical element before being transmitted by another optical element of the plurality of optical elements. For embodiments described herein, optical elements may be aligned in various arrangements without regard to a specific ordering within an optical series. For example, optical element A placed before optical element B, or optical element B placed before optical element A, may both be in optical series with each other. An optical series may represent a combination of optical elements having individual optical properties that are compounded with each other when placed in series.

As used herein, a material or element that is "transparent" or "optically transparent" may, for a given thickness, have a transmissivity within the visible light spectrum of at least approximately 70%, e.g., approximately 70, 80, 90, 95, 97, 98, 99, or 99.5%, including ranges between any of the foregoing values, and less than approximately 10% bulk haze, e.g., approximately 0.5, 1, 2, 4, 6, or 8% bulk haze, including ranges between any of the foregoing values. In accordance with some embodiments, a "fully transparent" material or element may have (a) a transmissivity (i.e., optical transmittance) within the visible light spectrum of at least approximately 90%, e.g., approximately 90, 95, 97, 98, 99, or 99.5%, including ranges between any of the foregoing values, (b) less than approximately 5% bulk haze, e.g., approximately 0.1, 0.25, 0.5, 1, 2, or 4% bulk haze, including ranges between any of the foregoing values, (c) less than approximately 30% reflectivity, e.g., approximately 1, 2, 5, 10, 15, 20, or 25% reflectivity, including ranges between any of the foregoing values, and (d) at least 70% optical clarity, e.g., approximately 70, 80, 90, 95, 97, 98, 99, or 99.5% optical clarity, including ranges between any of the foregoing values. Transparent and fully transparent materials will typically exhibit very low optical absorption and minimal optical scattering. In some embodiments, "transparency" may refer to internal transparency, i.e., exclusive of Fresnel reflections.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

A material or element that is "reflective" or "optically reflective" may, for example, have a transmissivity within the visible light spectrum of less than approximately 2%, e.g., less than 2, 1, 0.5, 0.2, or 0.1%, including ranges between any of the foregoing values.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

Figure 2A:
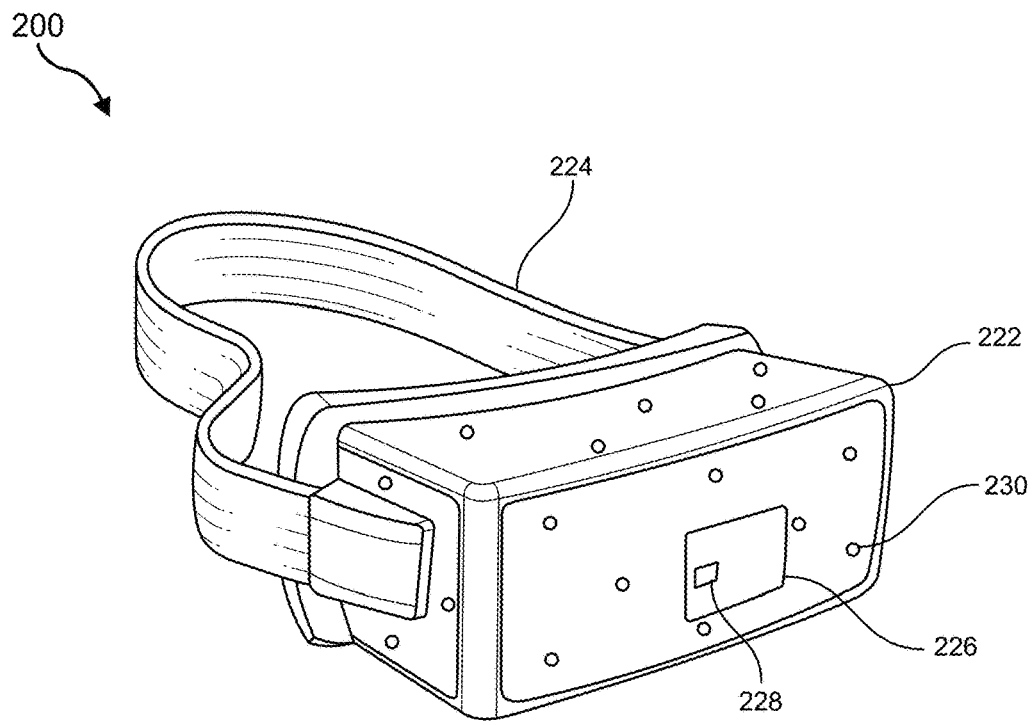
FIG. 2A is a perspective view of an example head-mounted display according to some embodiments.

FIG. 2A shows an example head-mounted display (HMD) 200 in accordance with some embodiments. As shown in FIG. 2A, the HMD 200 may include a front rigid body 222 and a band 224. The front rigid body 222 may include one or more electronic display elements of an electronic display, an inertial measurement unit (IMU) 226, one or more position sensors 228, and locators 230. In the example shown in FIG. 2A, position sensors 228 may be located within IMU 226, and neither IMU 226 nor position sensors 228 may be visible to a user on the device exterior. HMD 200 may, for example, function as a virtual reality device, an augmented reality device, and/or a mixed reality device. In some examples, when HMD 200 acts as an augmented or mixed reality device, portions of HMD 200 and its internal components may be at least partially transparent.

Figure 2B:
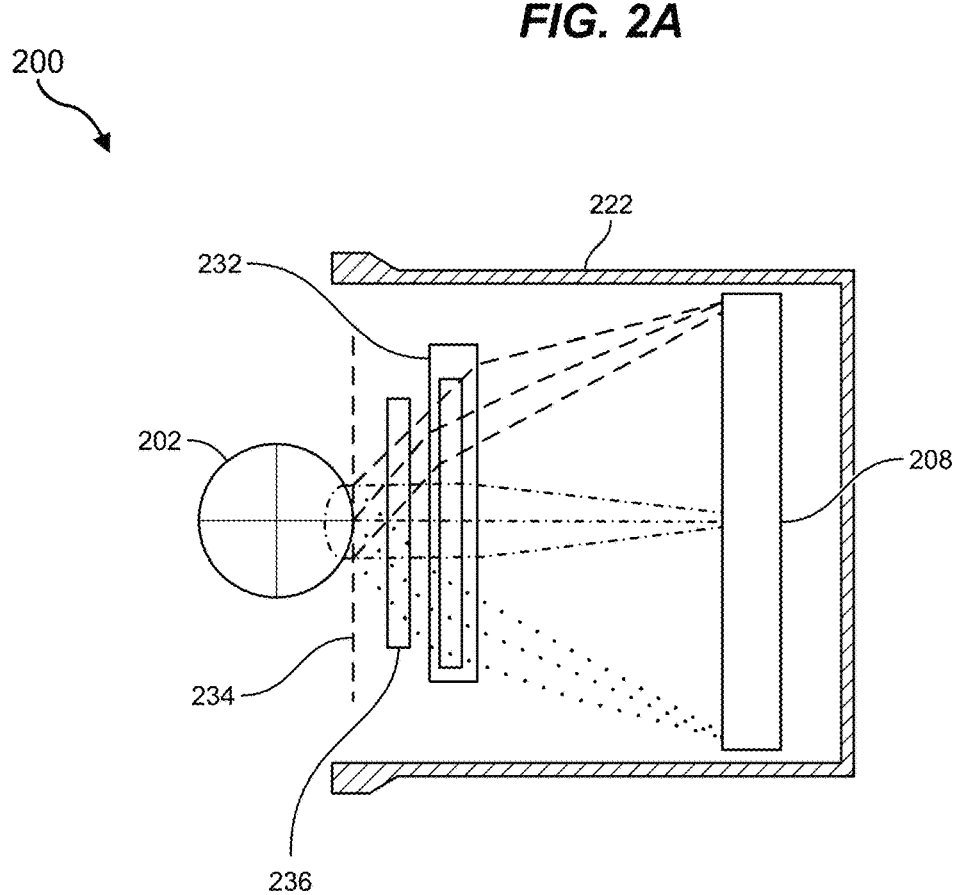
FIG. 2B is a cross-sectional view of a front rigid body of the head-mounted display shown in FIG. 2A according to some embodiments.

FIG. 2B is a cross-sectional view of the exemplary embodiment of HMD 200 shown in FIG. 2A. As shown in FIG. 2B, front rigid body 222 may include an electronic display 208, a varifocal block 232, and, in some examples, an eye-tracking system 236. Electronic display 208 may display images (i.e., virtual scenes) to a user wearing HMD 200. In some embodiments, electronic display 208 may include a stack of one or more waveguide displays including, but not limited to, a stacked waveguide display.

Varifocal block 232 may include one or more varifocal structures in optical series. A varifocal structure is an optical device that is configured to dynamically adjust its focus in accordance with instructions from a varifocal system. In some examples, varifocal block 232 may include a GRIN LC lens as disclosed herein (see, e.g., FIGS. 3-12). Electronic display 208 and varifocal block 232 together provide image light to an exit pupil 234. Eye-tracking system 236 may include, e.g., one or more sources that illuminate one or both eyes of the user and one or more cameras that capture images of one or both eyes of the user. Eye-tracking system 236 may detect a location of an object in the virtual scene at which the user's eye 202 is currently looking. Exit pupil 234 may be the location of front rigid body 222 where a user's eye 202 is positioned. For purposes of illustration, FIG. 2B shows a cross section of front rigid body 222 associated with a single eye 202, but another portion of varifocal block 232 or another varifocal block, which is separated from varifocal block 232, may provide altered image light to another eye of the user.

Figure 3:
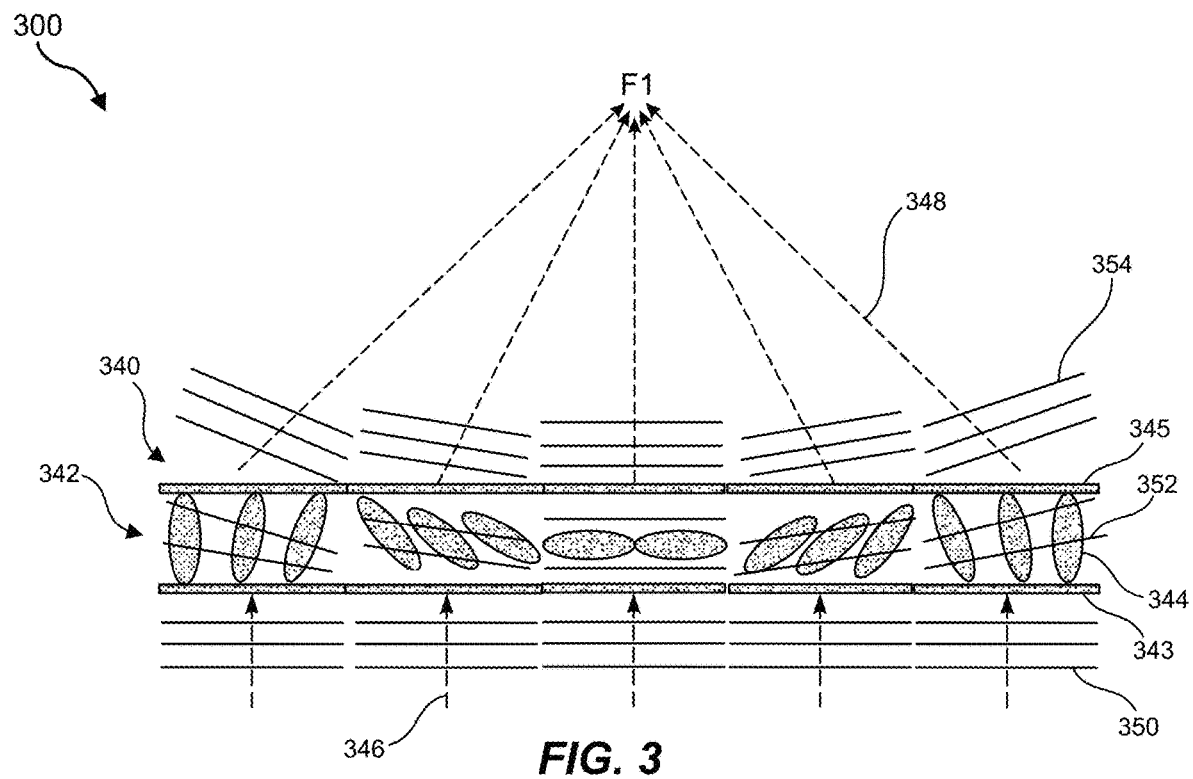
FIG. 3 is a diagram illustrating light refracted through an example gradient-index liquid crystal (GRIN LC) lens according to some embodiments.

FIG. 3 shows a diagram 300 of light refracted through an example GRIN LC lens 340 according to some embodiments. Liquid crystal orientations may be varied as desired between liquid crystal molecules located at central and peripheral positions within GRIN LC lens 340. For example, liquid crystal molecules may be selectively oriented so as to redirect incident light to provide a desired degree of optical power. GRIN LC lens 340 in FIG. 3 includes a liquid crystal layer 342 that includes a solution of liquid crystals molecules 344. As shown, liquid crystals molecules 344 may be selectively varied in orientation proceeding from a central region to a laterally peripheral region of liquid crystal layer 342. For example, liquid crystal molecules 344 at a central region of liquid crystal layer 342 may be oriented substantially horizontal to surfaces abutting liquid crystal layer 342 (see, e.g., alignment layers 466A and 466B shown in FIG. 4). Proceeding peripherally outward from the center, liquid crystal molecules 344 may progressively change in pitch, with liquid crystal molecules 344 assuming an increasingly angular slope.

The orientations of liquid crystal molecules 344 in each region of liquid crystal layer 342 may be oriented by, for example, progressively changing a voltage applied to liquid crystal layer 342 at the respective regions. For example, a voltage applied to the peripheral region of liquid crystal layer 342 may be higher or lower than a voltage applied to the central region of liquid crystal layer 342, with voltages between the central and peripheral regions progressively increasing or decreasing proceeding from the central region to the peripheral region. While rod-shaped liquid crystal molecules are illustrated in the example shown in FIG. 3, any suitable liquid crystal molecules having any suitable shape may be included in liquid crystal layer 342. For example, liquid crystal layer 342 may additionally or alternatively include disc-like (i.e., discotic), bowlic (i.e., conic), bent-core, and/or any other suitable type of liquid crystal molecules.

FIG. 3 illustrates the manner in which variations in liquid crystal orientation may alter paths of light beams passing through liquid crystal layer 342. In the example shown, incident light beams may be refracted through various regions of liquid crystal layer 342 so that they are focused at a common focal point F1. In some embodiments, liquid crystal molecules 344 in liquid crystal layer 342 may be oriented to instead refract light outward to provide divergent lensing. In the example illustrated in FIG. 3, incident light 346 may approach an incident side surface 343 of GRIN LC lens 340 along an incident wavefront 350 such that incident light 346 enters GRIN LC lens 340 at an angle that is approximately normal to incident side surface 343. As described in greater detail below with reference to FIG. 4, external side surfaces of liquid crystal layer 342 may include transparent surfaces, such as surfaces formed of glass, polymer, sapphire, silicon-based materials, etc., which may be uncoated or coated (e.g., with an antireflective film).

Figure 4:
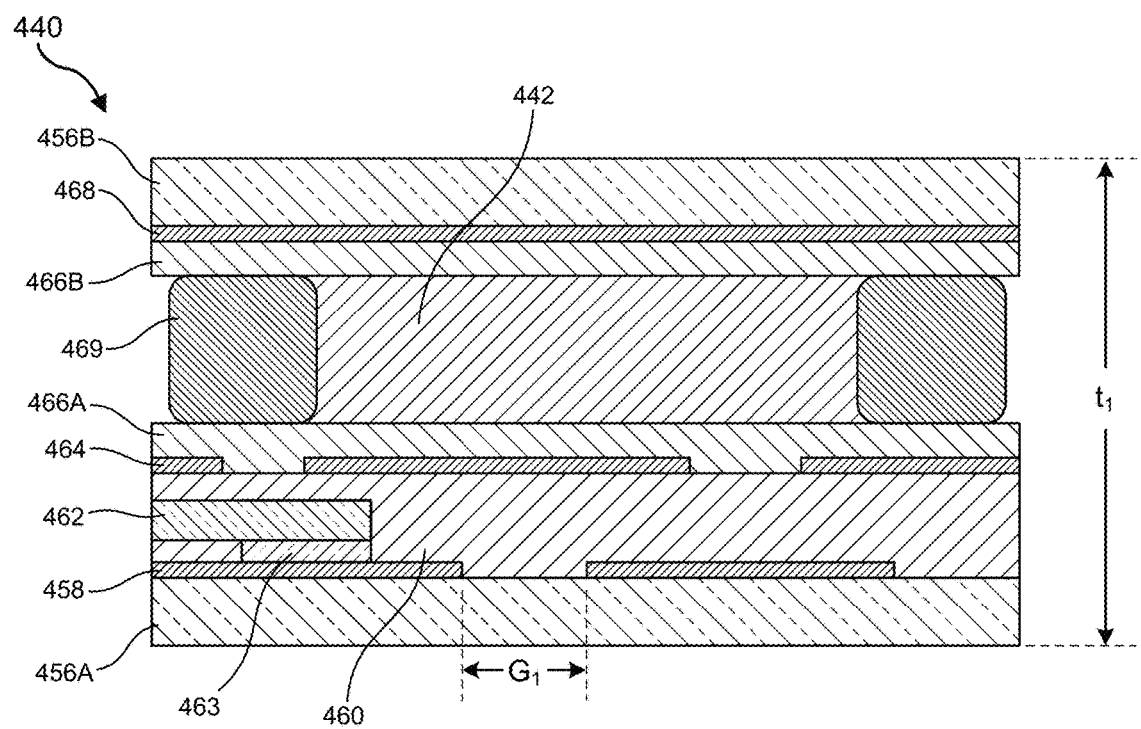
FIG. 4 is a cross-sectional diagram illustrating the structure of an example GRIN LC lens according to some embodiments.

Incident light 346 may pass through liquid crystal layer 342, where the light is refracted by liquid crystal molecules 344. Liquid crystal molecules 344 in different regions of liquid crystal layer 342 may be oriented at varied angles so as to refract light at correspondingly different angles within each region. For example, as shown in FIG. 3, liquid crystal molecules 344 may vary in degree of inclination with respect to abutting surfaces (e.g., alignment surfaces as shown in FIG. 4) along a gradient proceeding from the central region towards the outer periphery of liquid crystal layer 342. Liquid crystal molecules 344 having higher degrees of inclination may refract incoming light to a greater extent than those with lower degrees of inclination, as represented by liquid crystal wavefronts 352, which have different orientations corresponding to different inclinations of liquid crystal molecules 344 at various locations. The liquid crystal molecules 344 may thus be oriented at pitches that direct light in different regions towards a common focal point. Beams of exiting light 348 emitted from an exit side surface 345 of GRIN LC lens 340 are shown in FIG. 3. The exiting light 348 at different regions may be directed along corresponding exiting wavefronts 354 such that beams of exiting light 348 converge at an exemplary focal point F1.

In some examples, different voltage profiles may be applied to liquid crystal layer 342 to change optical characteristics of GRIN LC lens 340 as needed. For example, voltages may be selectively applied by an electrode array of GRIN LC lens 340 to reorient liquid crystal molecules 344 so as to change the location of focal point F1 and an optical power of GRIN LC lens 340. In at least one embodiment, liquid crystal molecules 344 may also be selectively oriented to produce a negative diopter in GRIN LC lens 340 so as to spread incoming light outward in a manner similar to a concave lens. In this example, the negative power may be accomplished by orienting liquid crystal molecules 344 within various regions of liquid crystal layer 342 to refract light outward to an increasingly greater extent proceeding from a central region outward toward the periphery.

FIG. 4 is a cross-sectional diagram illustrating the structure of an example GRIN LC lens 440 according to some embodiments. Dimensions of GRIN LC lens 440 and/or parts thereof illustrated in this figure are not necessarily to scale. As shown, GRIN LC lens 440 may include a pair of lens substrates 456A and 456B defining opposing outer surfaces of GRIN LC lens 440. Lens substrates 456A and/or 456B may be formed of one or more rigid, transparent materials, such as glass, sapphire, polymer, and/or silicon-based (e.g., $SiO_2$) materials. Lens substrates 456A and 456B may be substantially transparent in the visible wavelength band (i.e., approximately 380 nm to approximately 750 nm). In certain embodiments, the lens substrate 456A and/or 456B may also be transparent in some or all of the infrared (IR) band (i.e., approximately 750 nm to approximately 1 mm). Surfaces of lens substrates 456A and 456B may be uncoated or coated (e.g., with an antireflective film, polarization film, etc.). GRIN LC lens 440 may have a lens thickness t 1 measured from lens substrate 456A to lens substrate 456B.

As shown in FIG. 4, and array of driving electrodes 458 may be disposed on a first lens substrate 456A. Adjacent driving electrodes 458 may be separated from each other by intervening gaps $G_1$, as illustrated. Gaps $G_1$ may each have any suitable width between driving electrodes 458, such as a width of from approximately 0.5 µm to approximately 4 µm (e.g., approximately 0.5, 1.0, 1.5, 2.0, 2.5, 3.0, 3.5, or 4.0 µm). As described in additional detail below, adjacent driving electrodes 458 be electrically coupled to each other by a linking resistor within a shared driving zone (see, e.g., FIGS. 6, 7, and 10B). Driving electrodes 458 may be arranged in a driving electrode array that overlaps a liquid crystal layer 442 of GRIN LC lens 440.

A bus line 462 may be electrically coupled to at least one of driving electrodes 458 to provide selected voltages to driving electrodes 458. For example, bus line 462 may be electrically coupled to the illustrated driving electrode 458 by a via interconnect 463 extending directly between bus line 462 and the driving electrode 458. Voltages at other driving electrodes 458 may be different than the voltage applied by bus line 462 due to, for example, reductions in voltages across the inter-electrode resistors connecting other driving electrodes 458 to the driving electrode 458 coupled to the bus line 462. Voltages applied to each of driving electrodes 458 may be controllably varied to produce desired lensing of light passing through liquid crystal layer 442. In various examples, GRIN LC lens 440 may include multiple bus lines that are each electrically coupled to different electrodes to provide separate driving zones and/or Fresnel reset regions, as discussed in more detail below. Additionally, multiple bus lines within a particular driving zone and/or Fresnel reset may be used to apply different voltages to separate driving electrodes 458 so as to provide a voltage gradient(s) between the driving electrodes 458.

According to at least one embodiment, an insulating layer 460 may be disposed over driving electrodes 458 and bus line 462. Insulating layer 460 may also surround portions of bus line 462 not directly coupled to a driving electrode 458 such that portions of insulating layer 460 are disposed between bus line 462 and other driving electrodes 458. In some examples, portions of insulating layer 460 may also be disposed in gaps $G_1$ defined between adjacent driving electrodes 458. Insulating layer 460 may include one or more dielectric layers, which may include a stoichiometric or non-stoichiometric oxide, fluoride, oxyfluoride, nitride, oxynitride, sulfide, $SiO_2$, $TiO_2$, $Al_2O_3$, $Y_2O_3$, $HfO_2$, $ZrO_2$, $Ta_2O_5$, $Cr_2O_3$, $AlF_3$, $MgFS2$, $NdF_3$, $LaF_3$, $YF_3$, $CeF_3$, $YbF_3$, $Si_3N_4$, ZnS, and/or ZnSe.

A floating electrode array including a plurality of floating electrodes 464 may be disposed on insulating layer 460 so that insulating layer 460 is disposed between driving electrodes 458/bus line 462 and floating electrodes 464. As shown in FIG. 4, floating electrodes 464 may be arrayed so as to overlap gaps $G_1$ between driving electrodes 458. Floating electrodes 464 may be capacitively coupled to driving electrodes 458 rather than directly driven by ohmic connection to driving electrodes 458. In some examples, floating electrodes 464 may be configured to cover a portion of the area of each of neighboring driving electrode 458 (e.g., up to approximately half of each neighboring driving electrode 458). In some examples floating electrodes 464 may be configured to overlap a substantial portion (e.g., approximately half or less) of the area of each neighboring driving electrode 458. Floating electrodes 464 may address image degradation in GRIN LC lens 440 by reducing light scattering due to gaps G1 defined between adjacent driving electrodes 458.

A first alignment layer 466A may be formed over floating electrodes 464 and portions of insulating layer 460 exposed in gap regions between adjacent floating electrodes 464. First alignment layer 466A may contact liquid crystal layer 442 and may enable proper orientation of liquid crystal molecules within liquid crystal layer 442. First alignment layer 466A may include any material and surface texture suitable for aligning liquid crystal molecules in a desired manner. For example, first alignment layer 442 may be formed of a polyimide (PI) material that is rubbed on the surface facing liquid crystal layer 442. In at least one example, first alignment layer 466A may be formed of a PI layer having a surface that is modified by irradiation with ultraviolet (UV) light to promote curing or partial curing of the PI material. Following UV irradiation, the surface of first alignment layer 466A may be mechanically rubbed in selected directions (e.g., horizontally, circularly, etc.) to provide a substantially consistent surface structure producing predictable surface alignment of liquid crystal molecules in liquid crystal layer 442. Any other suitable material or combination of materials may be included in first alignment layer 466A, including, for example, polymers (e.g., perfluoropolyether films), metal-oxides, and/or carbon nanotubes.

GRIN LC lens 440 may also include a second alignment layer 466B facing first alignment layer 466A. In some embodiments, second alignment layer 466B may be formed in the same or similar manner as first alignment layer 466A and may include the same or similar materials (e.g., PI). Additionally or alternatively, second alignment layer 466B may include any other suitable materials formed using any suitable technique providing a surface configured to adequately align liquid crystal molecules within liquid crystal layer 442 in combination with first alignment layer 466A.

Liquid crystal layer 442 may be disposed between first and second alignment layers 466A and 466B, as illustrated in FIG. 4. Additionally, a gasket 469 may be disposed between first and second alignment layers 466A and 466B and may at least partially surround an outer periphery of liquid crystal layer 442. In some examples, gasket 469 may include spacers to maintain a selected space (i.e., LC cell space) between first and second alignment layers 466A and 466B such that liquid crystal layer 442 has a cell thickness suitable for proper operation, as described herein. Additional spacers may be included as needed between first and second alignment layers 466A and 466B to maintain a consistent space between the layers. Gasket 469 may provide an edge seal around liquid crystal layer 442 and may include any suitable adhesive and/or sealing agent to prevent leakage at the periphery.

In various embodiments, GRIN LC lens 440 may additionally include at least one common electrode 468 disposed between second alignment layer 466B and second lens substrate 456B. In one example, common electrode 468 may be formed as a unitary layer overlapping all or substantially all of liquid crystal layer 442, driving electrodes 458, and floating electrodes 464. In certain examples, GRIN LC lens 440 may include multiple common electrodes 468 that together cover or substantially cover liquid crystal layer 442. An electric field may be generated between common electrode 468 and driving electrodes 458 and/or floating electrodes 464 when selected voltages are applied to common electrode 468 and driving electrodes 458. In various examples, common electrode 468 may be held at a single selected voltage and, in combination with driving electrodes 458 and/or floating electrodes 464, may enable a range of voltage differentials to be selectively applied to regions of liquid crystal layer 442. Accordingly, driving electrodes 458 may, in combination with common electrode 468, generate variable electric fields that reorient liquid crystal molecules in liquid crystal layer 442 to produce a desired lens phase profile.

Driving electrodes 458, floating electrodes 464, common electrode 468, and bus line 462 may include one or more electrically conductive materials, such as a semiconductor (e.g., a doped semiconductor), metal, carbon nanotube, graphene, oxidized graphene, fluorinated graphene, hydrogenated graphene, other graphene derivatives, carbon black, transparent conductive oxides (TCOs, e.g., indium tin oxide (ITO), zinc oxide (ZnO), indium gallium zinc oxide (IGZO), etc.), conducting polymers (e.g., PEDOT), and/or other electrically conductive material. In some embodiments, the electrodes may include a metal such as nickel, aluminum, gold, silver, platinum, palladium, tantalum, tin, copper, indium, gallium, zinc, alloys thereof, and the like. Further example transparent conductive oxides include, without limitation, aluminum-doped zinc oxide, fluorine-doped tin oxide, indium-doped cadmium oxide, indium zinc oxide, indium zinc tin oxide, indium gallium tin oxide, indium gallium zinc oxide, indium gallium zinc tin oxide, strontium vanadate, strontium niobate, strontium molybdate, and calcium molybdate. In some examples, the electrodes and/or bus line may each include one or more layers, grids, nanowires, etc. of any suitable transparent conductive material, such as transparent conductive oxides, graphene, etc. Driving electrodes 458, floating electrodes 464, common electrode 468, and/or bus line 462 may have an optical transmissivity of at least approximately 50% (e.g., approximately 50%, approximately 60%, approximately 70%, approximately 80%, approximately 90%, approximately 95%, approximately 97%, approximately 98%, approximately 99%, or approximately 99.5%, including ranges between any of the foregoing values).

Electrode patterns for GRIN LC lenses, as disclosed herein, may be configured to produce desired lens profiles when operated. For example, modeling may be utilized to determine and/or optimize various design parameters, such as the shapes of the electrodes, the number of driving electrodes, the number of Fresnel reset regions, the types of resistors coupling adjacent electrodes, and/or the number of bus lines utilized to produce adequate lens shapes and provide a sufficient range of lens power while minimizing visual aberrations and delays in response time that might be perceptible to a wearer.

A "director," as used herein, may refer to an axis oriented in an average direction of long molecular axes of all liquid crystal molecules in a liquid crystal bulk or selected region thereof. Individual liquid crystal molecules may be more or less aligned with this directional axis. Accordingly, liquid crystal molecules, such as rod-like liquid crystal molecules, may be generally oriented such that their moments of inertia are roughly aligned along the director.

Figure 5:
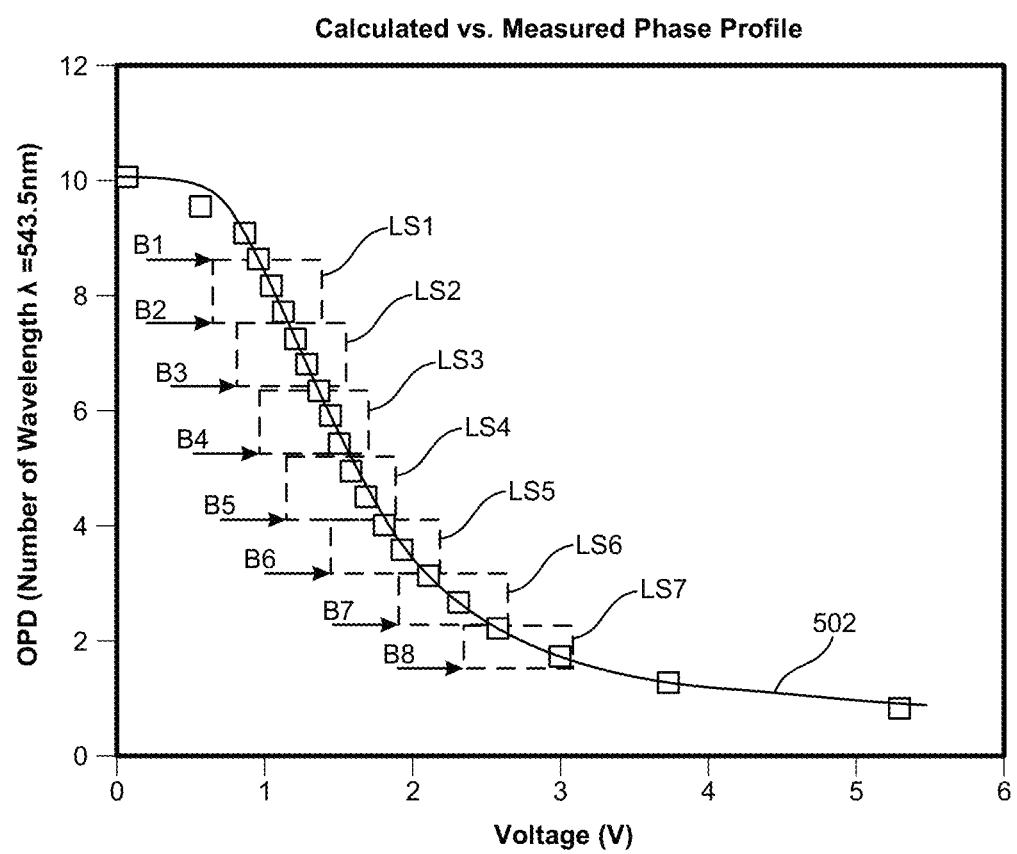
FIG. 5 is a plot illustrating a curve of optical path difference versus voltage utilized to obtain a desired liquid phase profile according to some embodiments.

FIG. 5 is a plot illustrating a curve of optical path difference (OPD) versus voltage that may be utilized in director modeling to optimize certain design parameters of a GRIN LC lens as disclosed herein. In some embodiments, a liquid crystal relaxation method may be used to numerically calculate a director configuration at equilibrium. In this method, the calculation for the director configuration may be determined by minimizing the free energy for a given set of boundary conditions and external fields. This calculation may then be utilized to obtain the desired phase profile.

A GRIN LC lens design may include concentric ring-shaped electrodes (see, e.g., FIGS. 6, 7, and 10B) with substantially identical areas to produce a parabolic phase profile or other suitable aspheric phase profile (e.g., elliptical, hyperbolic, etc.). With this electrode geometry, a parabolic phase may be obtained when the phase difference between adjacent electrodes is approximately the same. If the phase is proportional to the applied voltage, a linear change in the voltage across the electrodes (i.e., with approximately the same difference in voltage between any two electrodes) would yield a parabolic phase profile. To impose a linear voltage drop over several electrodes, interring resistors can be utilized. The resistors between electrodes may act as voltage dividers. If the phase vs. voltage curve were in general linear, only two interconnections would be required to drive the lens. Additional resistive interconnections are utilized, however, to provide a curved phase profile, with more than three interconnections enabling a parabolic phase profile.

In various embodiments, the slope of optical path difference (OPD) vs. voltage curve 502 of a liquid crystal material, as disclosed herein, may not remain constant but may rather become substantially steeper at regions corresponding to lower voltage values. In at least one example, the non-linearity of OPD vs. voltage curve 502 may be addressed by segmenting curve 502 into a number of different linear sections that together may better approximate the profile of curve 502 in a manner that has little or no impact on perceptible optical characteristics of the resulting GRIN LC lens. As shown in FIG. 5, curve 502 is broken up into a number of linear sections LS1-LS7 (boxes surround the relevant sections of curve 502 for ease of illustration). When utilizing resistors of approximately the same value between neighboring driving electrodes, in accordance with various embodiments, voltages in each region may be reliably defined by connections to a programmable voltage source at end points of linear segments LS1-LS7 shown in FIG. 5.

While seven linear sections are shown in the illustrated example, curve 502 may be segregated into any other suitable number of linear sections. The number of linear sections may determine the number of interconnections and bus lines required to drive the GRIN LC lens. In the example illustrated in FIG. 5, eight bus lines B1-B8, which are each supplied with a different voltage, are used to obtain linear voltage drops at linear sections LS1-LS7. Bus lines B1-B8 are shown at positions on curve 502 corresponding to voltage values that would be respectively applied to each of bus lines B1-B8. Each linear section has a linear drop in voltage between a driving electrode directly coupled to a higher voltage bus line and a driving electrode directly coupled to a lower voltage bus line. Resistors separating neighboring driving electrodes between the driving electrodes directly coupled to the bus lines may maintain a consistent voltage drop between the neighboring driving electrodes.

Figure 6:
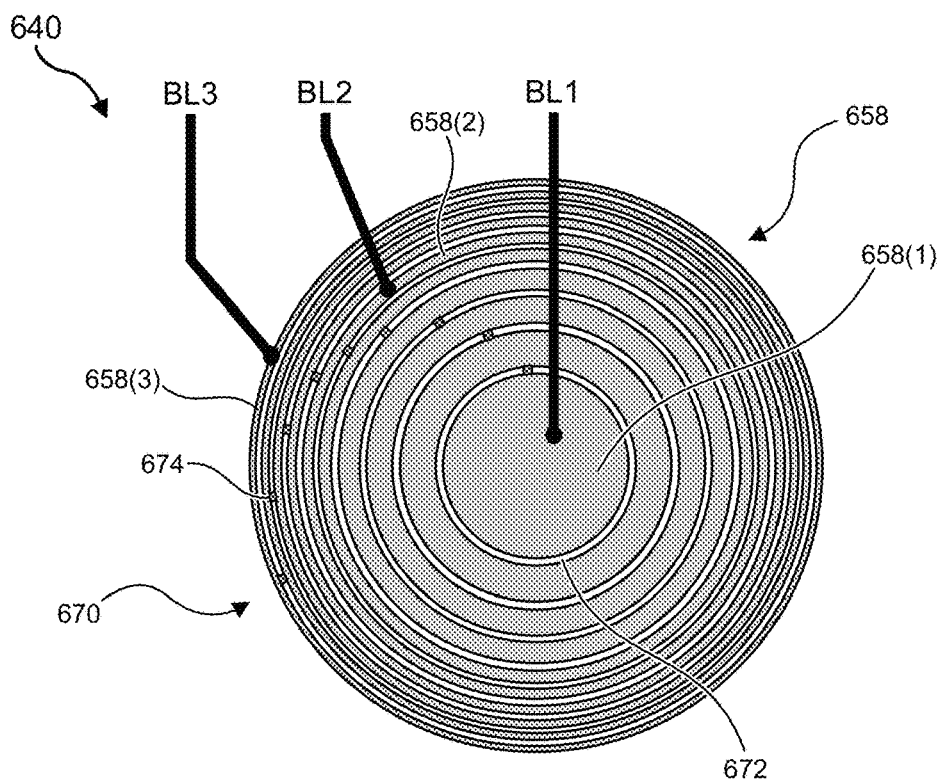
FIG. 6 illustrates an example GRIN LC lens according to some embodiments.

FIG. 6 illustrates a GRIN LC lens 640 that includes a driving electrode array 670 according to some embodiments. The illustrated driving electrode array 670 may represent a simplified patterned array presented for purposes of illustration, and various exemplary electrode arrays may include a greater number of driving electrodes and bus lines. As shown, driving electrode array 670 includes a plurality of driving electrodes 658 that are arranged in concentric rings surrounding a central, circular driving electrode 658(1). The areas covered by each of the plurality of driving electrodes 658 (i.e., the areas overlapping a corresponding liquid crystal layer) may be approximately the same. Hence, driving electrodes 658, most of which have a ring-shaped profile following an arcuate path (e.g., a circular path), may decrease in width as the electrode circumferences increase, proceeding from central driving electrode 658(1) outward. As shown, driving electrode array 670 may have a circular shape configured to overlap a circular-shaped liquid lens layer having approximately the same shape and dimensions. However, in some embodiments, driving electrode array 670 and GRIN LC lens 640 may have any other suitable profile shape, including a noncircular shape.

As shown in FIG. 6, neighboring driving electrodes 658 are separated by ring-shaped gap regions 672 (see gap $G_1$ in FIG. 4). Gap regions 672 may have widths of, for example, from approximately 0.5 μm to approximately 5 μm. Additionally, a separate resistor 674 may connect each pair of neighboring driving electrodes 658. The resistors 674 may enable each driving electrode 658 to be maintained at a different voltage when different voltages are applied via bus lines to two or more of driving electrodes 658. In some examples, consecutive resistors 674 may be located at different angular positions along driving electrode array 670. For example, neighboring resistors 674 may be separated by angular distances of from approximately 1° to approximately 10° or more.

In the example of FIG. 6, three example bus lines BL1, BL2, and BL3 are illustrated. Bus lines BL1, BL2, and BL3 are each electrically coupled (i.e., directly coupled, connected, or otherwise attached electrically) to a different driving electrode 658. In the illustrated example, bus line BL1 is electrically coupled to the center-most driving electrode 658(1) and bus line BL3 is electrically coupled to a driving electrode 658(3) located at a more peripheral position. Bus line BL2 is electrically coupled to a driving electrode 658(2) disposed between driving electrodes 658(1) and 658(3) (i.e., between the center and outer periphery of driving electrode array 670). The plurality of driving electrodes 658 may produce a varying electric field in conjunction with one or more common lines disposed on an opposite side of an overlapping liquid crystal layer (see, e.g., common electrode 468 disposed on a side of liquid crystal layer 442 opposite driving electrodes 458, as shown in FIG. 4). The electric field generated between driving electrodes 658 and the overlapping common electrode(s) may produce selected alignments of liquid crystal molecules in the liquid crystal layer. In some embodiments, the common electrode (s) may be maintained at a particular voltage value, and variations in liquid crystal alignments may correspond to different voltages of overlapping driving electrodes 658.

In at least one example, a first voltage may be applied by bus line BL1 to driving electrode 658(1) and a lower or higher voltage may be applied by bus line BL3 to driving electrode 658(3). A voltage having a value between that of bus lines BL1 and BL3 may be applied by bus line BL2 to driving electrode 658(2). In some examples, voltages of driving electrodes 658 may decrease or increase linearly or substantially linearly between pairs of bus lines (see, e.g., linear sections LS1-LS7 between pairs of bus lines B1-B8 shown in FIG. 5). This may be accomplished by, for example, providing resistors 674 that have substantially the same value between each pair of neighboring driving electrodes 658. Accordingly, voltage drops between neighboring driving electrodes 658 located between two bus lines (e.g., between bus lines BL1 and BL2 and/or between bus lines BL2 and BL3) may be relatively consistent.

In at least one embodiment, amounts of voltage drop or increase between adjacent driving electrodes 658 and/or between neighboring bus lines may be substantially constant. Because the radial width of driving electrodes 658 progressively decreases proceeding from the center of driving electrode array 670 outward, the voltage changes may likewise change at progressively smaller intervals proceeding radially outward. The decreasing radial intervals between driving electrodes 658 may result in progressively greater changes in liquid crystal orientation proceeding radially outward along the GRIN LC lens so that a selected lens curvature (e.g., a spherical curvature) is applied to light passing through the GRIN LC lens. For example, in one embodiment, bus line BL1 may apply approximately 4 V to the center-most driving electrode 658(1) and bus line BL3 may apply approximately 0 V to the outer-most driving electrode 658(3). In this example, bus line BL2 may apply approximately 2 V to driving electrode 658(2), which is disposed at a location between driving electrodes 658(1) and 658(3). Driving electrode 658(2) may be located such that the number of driving electrodes 658 located between driving electrodes 658(1) and 658(2) is the same or nearly the same as the number of driving electrodes 658 located between driving electrodes 658(2) and 658(3). Any other suitable number, distribution, and/or configuration of driving electrodes 658 may be utilized in various examples.

In some embodiments, voltage drops between different pairs of bus lines may have different slopes so as to produce a desired lens profile in the GRIN LC lens. Any suitable combination of voltage values may be applied to bus line BL1-BL3 to produce selected electrical field gradients in an overlapping liquid crystal layer. For example, a total voltage drop between bus lines BL2 and BL3 may be more or less steep than a total voltage drop between bus lines BL1 and BL2.

Figure 7:
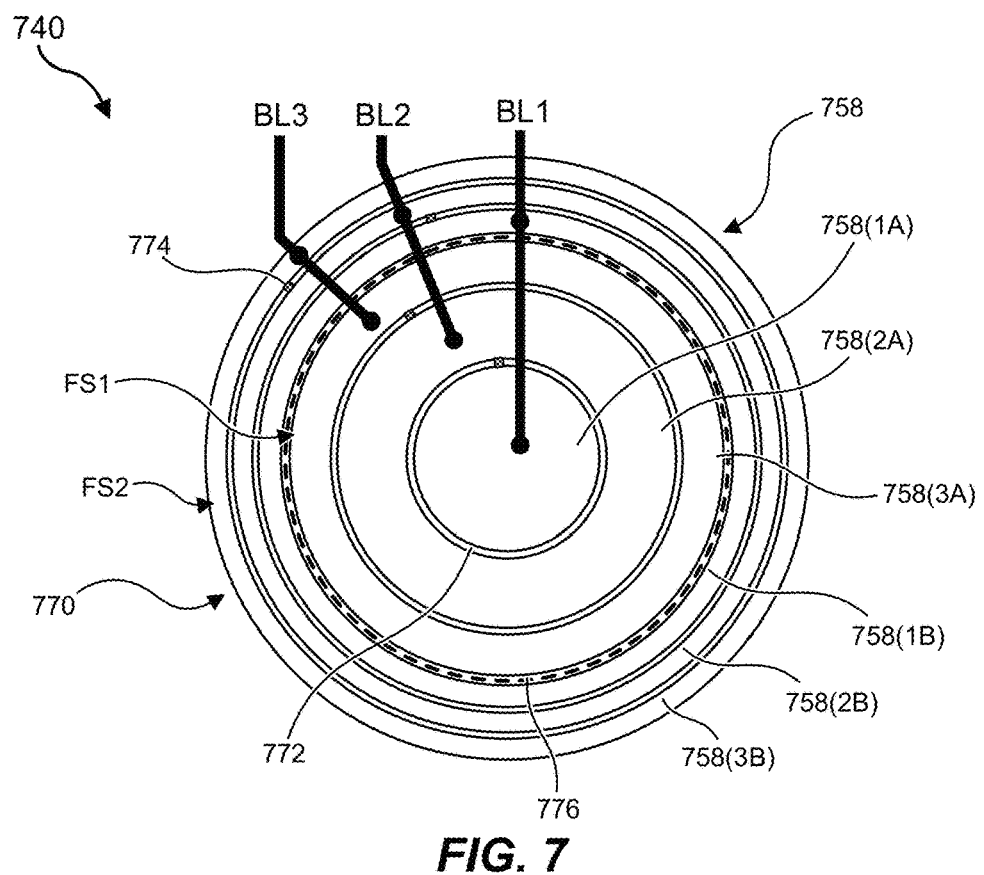
FIG. 7 illustrates an example GRIN LC lens having two Fresnel reset regions according to some embodiments.

FIG. 7 illustrates a GRIN LC lens 740 that includes a driving electrode array 770, in accordance with some embodiments. The illustrated driving electrode array 770 may represent a simplified array and Fresnel layout presented for purposes of illustration, and various exemplary electrode arrays may include a greater number of driving electrodes, bus lines, and/or Fresnel segments. As shown, driving electrode array 770 includes a plurality of driving electrodes 758 that are arranged in concentric rings. As shown, driving electrode array 770 may have a circular shape configured to overlap a circular-shaped liquid lens layer having approximately the same shape and dimensions. However, in some embodiments, driving electrode array 770 and GRIN LC lens 740 may have any other suitable profile shape, including a noncircular shape.

Driving electrode array 770 may be divided into a plurality of Fresnel segments. In the example shown in FIG. 7, driving electrode array 770 is divided into first and second Fresnel segments FS1 and FS2. Fresnel segments FS1 and FS2 may be utilized to generate Fresnel resets in a phase profile of GRIN LC lens 740, as discussed in greater detail below. Neighboring driving electrodes 758 may be separated by ring-shaped gap regions 772 and resistors 774 may connect pairs of neighboring driving electrodes 758 within each of Fresnel segments FS1 and FS2. An intermediate gap 776 may be defined between Fresnel segments FS1 and FS2. Unlike gap regions 772 disposed between adjacent driving electrodes 758 within each Fresnel segment, electrodes in Fresnel segments FS1 and FS2 adjacent to intermediate gap 776 may not be electrically connected to each other via a resistor or other connector bridging the electrodes across intermediate gap 776. Accordingly, first and second Fresnel segments FS1 and FS2 may produce distinct voltage gradients in independently operable lens regions in GRIN LC lens 740.

In the embodiment of FIG. 7, three example bus lines BL1, BL2, and BL3 are illustrated. Bus lines BL1, BL2, and BL3 are each electrically coupled (i.e., directly coupled, connected, or attached electrically) to a different respective driving electrode 758 in each of first and second Fresnel segments FS1 and FS2. In the illustrated example, bus line BL1 is electrically coupled to each of driving electrodes 758(1A) and 758(1B), bus line BL2 is electrically coupled to each of driving electrodes 758(2A) and 758(2B), and bus line BL3 is electrically coupled to each of driving electrodes 758(3A) and 758(3B) located respectively within each of Fresnel segments FS1 and FS2. In at least one example, a first voltage may be applied by bus line BL1 to driving electrodes 758(1A) and 758(1B) and a lower or higher voltage may be applied by bus line BL3 to driving electrodes 758(3A) and 758(3B). A voltage having a value between that of bus lines BL1 and BL3 may be applied by bus line BL2 to driving electrodes 758(2A) and 758(2B).

Driving electrode array 770 may be utilized to provide GRIN LC lens 740 with a segregated Fresnel structure. The GRIN LC lens may include any appropriate type of Fresnel structure, such as a Fresnel zone plate lens including areas that have a phase difference of a half-wave to adjacent areas, a diffractive Fresnel lens having a segmented parabolic phase profile where the segments are small and can result in significant diffraction, or a refractive Fresnel lens having a segmented parabolic profile where the segments are large enough so that diffraction effects are minimized. Other structures may also be used.

In some embodiments, the driving electrode array 770 may be utilized in a refractive Fresnel GRIN LC lens having a segmented parabolic profile, where the segments are large enough that the resulting diffraction angle is smaller than the angular resolution of human eyes (i.e., diffraction effects are not observable by human eyes). Such a refractive Fresnel LC lens may be referred to as a segmented phase profile (SPP) LC lens.

For a positive thin lens, optical path difference (OPD) can be approximated with a Maclaurin series to a parabolic profile as shown in Equation (1)

$$OPD(r) = \frac{r^2}{2f}, \tag{1}$$

where r is the lens radius (i.e., half of the lens aperture) and f is the focal length. The OPD of an LC lens is proportional to the cell thickness d and the birefringence Δn of the LC material as shown in Equation (2)

$$OPD = \Delta n \times d \to d \propto r^2 \tag{2}$$

The response time τ of an Electrically Controlled Birefringence (ECB) LC cell, which is the time the material requires to recover to its original state, is quadratically dependent on cell thickness d (τ∝r⁴) as shown in Equation (3)

$$\tau = \frac{(\gamma \times d^2)}{(K_{22} \times \pi^2)}, \tag{3}$$

where γ and $K_{22}$ are the rotational viscosity and the splay elastic constant of the LC material, respectively. As equations (1)-(3) show, there is typically a tradeoff between the aperture size and response time. Thus, designing a GRIN LC lens with large aperture and reasonable response time has conventionally presented challenges. In the disclosed embodiments, by introducing phase resets (i.e., Fresnel resets) in the parabolic phase profile, the aperture size of the LC lens may be increased without compromising the response time.

Figure 8A:
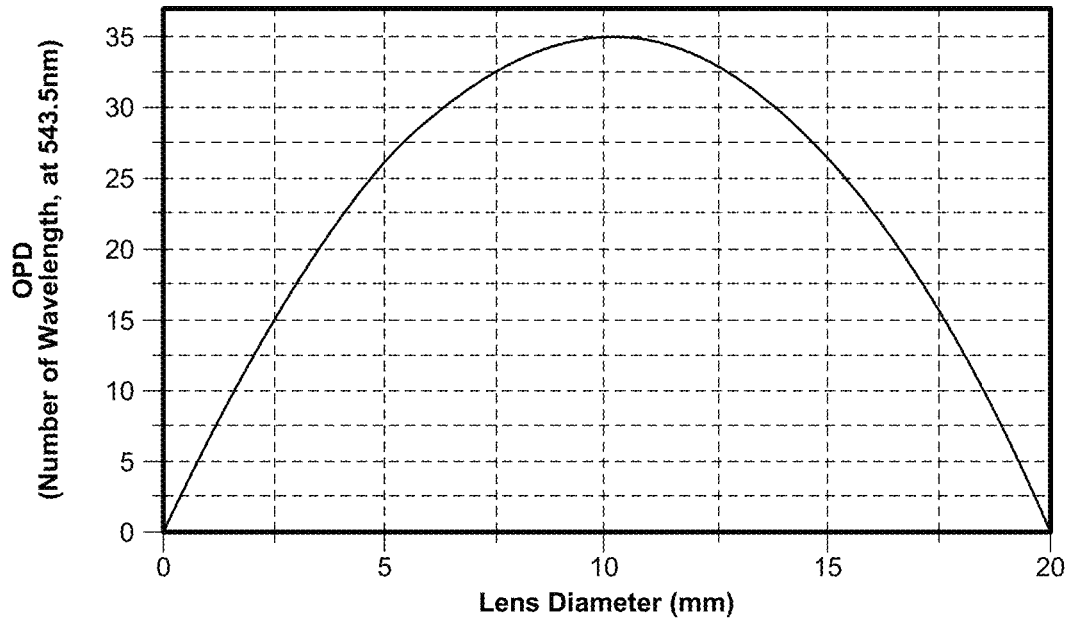
FIG. 8A is a plot showing an ideal parabolic phase profile for an example GRIN LC lens according to some embodiments.

FIG. 8A illustrates an exemplary target parabolic phase profile for a ±0.375 Diopter (D) GRIN LC lens having a lens diameter of 20 mm, where the OPD equals to 35λ. The thickness of the LC cell for this lens would be approximately 70 μm for LC materials having a birefringence value of 0.27. To decrease the effective thickness of the LC cell, Fresnel resets or segments may be introduced into the lens phase profile.

Figure 8B:
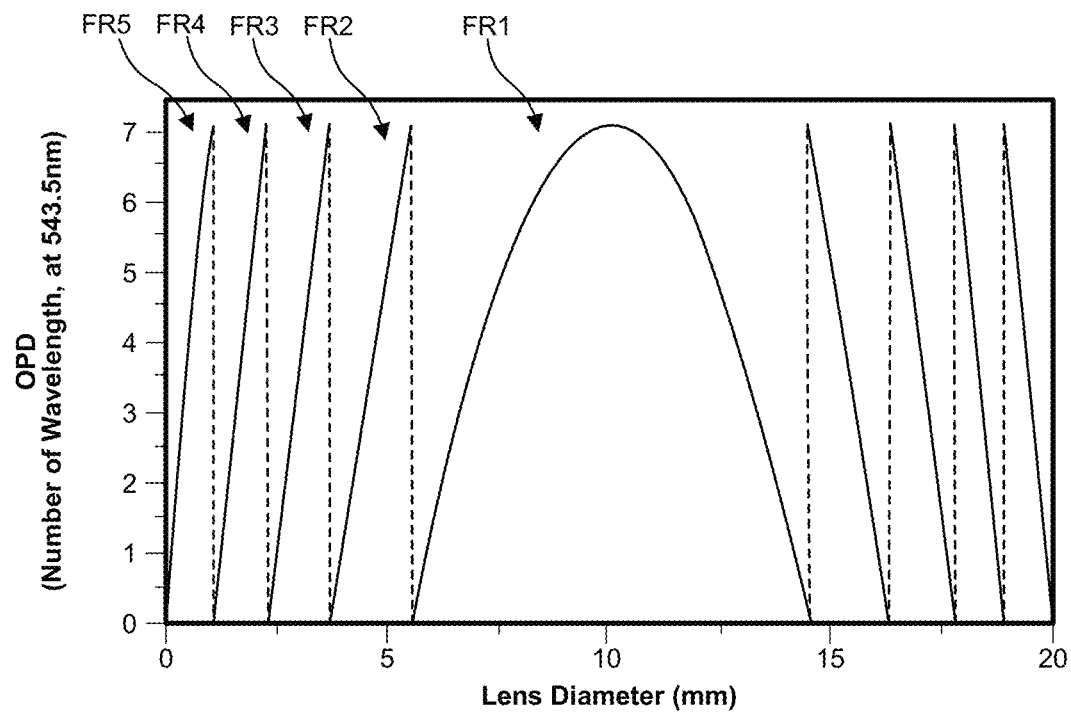
FIG. 8B is a plot showing a 2-dimensional (2D) phase map for an example GRIN LC lens having five Fresnel resets according to some embodiments.

FIG. 8B illustrates a phase map of an exemplary GRIN LC lens having five Fresnel resets FR1-FR5 that together approximate the lens characteristics of the idealized phase profile of FIG. 8A. As shown, the centermost Fresnel reset FR1 may occupy a wide area surrounding the center of the GRIN LC lens. Additional Fresnel resets FR2-FR5 surrounding central Fresnel reset FR1 may have thicknesses that are sequentially reduced proceeding peripherally outward toward the lens periphery. For example, Fresnel reset FR2 may be radially thinner than Fresnel reset FR1. Additionally, Fresnel reset FR3 may be radially thinner than Fresnel reset FR2, Fresnel reset FR4 may be radially thinner than Fresnel reset FR3, and Fresnel reset FR5 may be radially thinner than Fresnel reset FR4. The phase profiles of each of Fresnel resets FR1-FR5 may likewise increase in conjunction with decreases in thickness of the resets. For example, Fresnel reset FR5 may have a steeper profile than Fresnel reset FR4, which has a steeper profile than Fresnel reset FR3. Fresnel reset FR3 may likewise have a steeper profile than Fresnel reset FR2, which has a steeper profile than central Fresnel reset FR1.

Figure 8C:
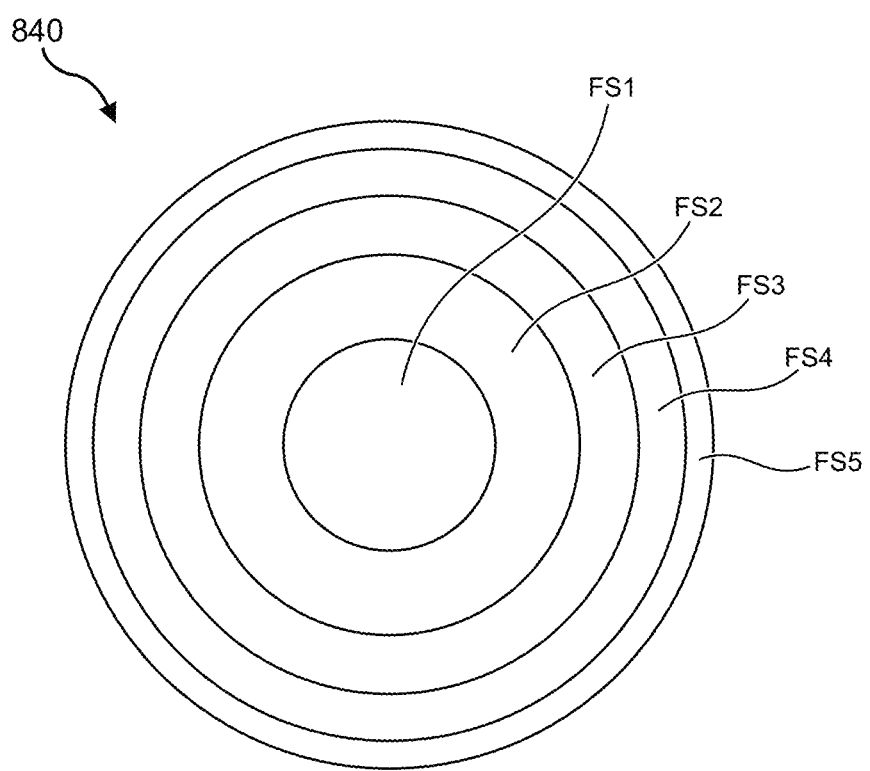
FIG. 8C illustrates an example GRIN LC lens including five Fresnel segments for producing five Fresnel resets as shown in FIG. 8B according to some embodiments.

FIG. 8C illustrates an exemplary GRIN LC lens 840 that includes a plurality of concentric ring-shaped segments of increasing radii that are referred to as Fresnel segments. As shown in FIG. 8C, GRIN LC lens 840 may have five Fresnel segments FS1-FS5 respectively corresponding to the five Fresnel resets FR1-FR5 mapped in FIG. 8B. As shown in FIG. 8C, Fresnel segment FS1 may be centrally located and Fresnel segments FS2-FS5 may concentrically surround Fresnel segment FS1. For example, Fresnel segment FS2 may circumferentially surround central Fresnel segment FS1, Fresnel segment FS3 may circumferentially surround Fresnel segment FS2, Fresnel segment FS4 may circumferentially surround Fresnel segment FS3, and outermost Fresnel segment FS5 may circumferentially surround Fresnel segment FS4. In correspondence with variations in thicknesses of Fresnel resets FR1-FR5 as shown in FIG. 8B, FIG. 8C likewise shows that Fresnel segments FS1-FS5 may progressively decrease in radial thickness proceeding from the centermost Fresnel segment FS1 outward.

The five Fresnel segments FS1-FS5 of GRIN LC lens 840 may enable the corresponding LC cell thickness of GRIN LC lens 840 to be reduced up to five times, resulting in an LC cell thickness as low as approximately 14 μm. Likewise, the response time of the illustrated GRIN LC lens may be improved by a factor of up to 25. That is, the introduction of the Fresnel resets in the GRIN LC lens phase profile may enable the optical power of GRIN LC lens 840 to be adjusted sufficiently fast to keep pace with human eye accommodation (e.g., accommodation may occur in approximately 300 ms) such that the vergence-accommodation conflict may be substantially or fully resolved. The number of Fresnel resets/segments in a particular lens may be determined based on specific configurations of the Fresnel structure and the GRIN LC lens requirements, such as the desired optical power, lens aperture, switching time, and/or image quality of the GRIN LC lens.

Figure 9A:
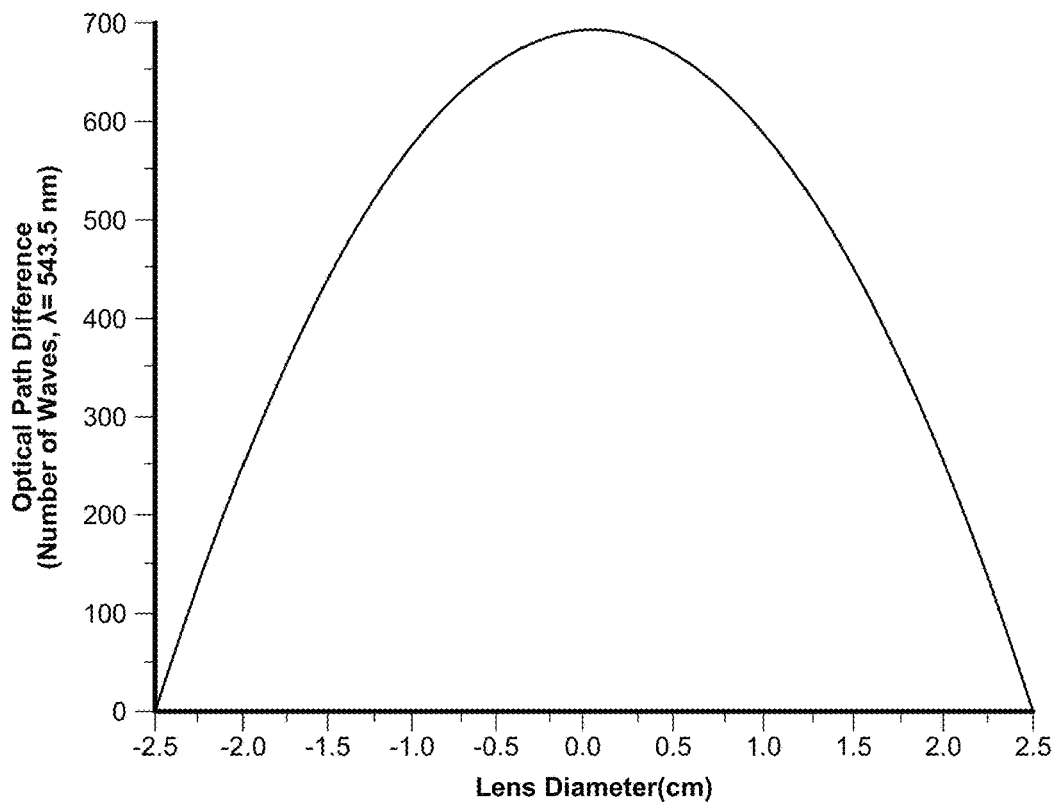
FIG. 9A is a plot showing an ideal parabolic phase profile for an example large-diameter GRIN LC lens according to some embodiments.

FIG. 9A illustrates an exemplary target parabolic phase profile for a GRIN LC lens having a greater width and focal range than that shown in FIG. 8A. For example, the GRIN LC lens mapped in FIG. 9A has a focal range of ±1.20 D, a lens diameter of 50 mm (5.0 cm), and an OPD that equals to approximately 700λ for a green wavelength of approximately 543.5 nm.

Figure 9B:
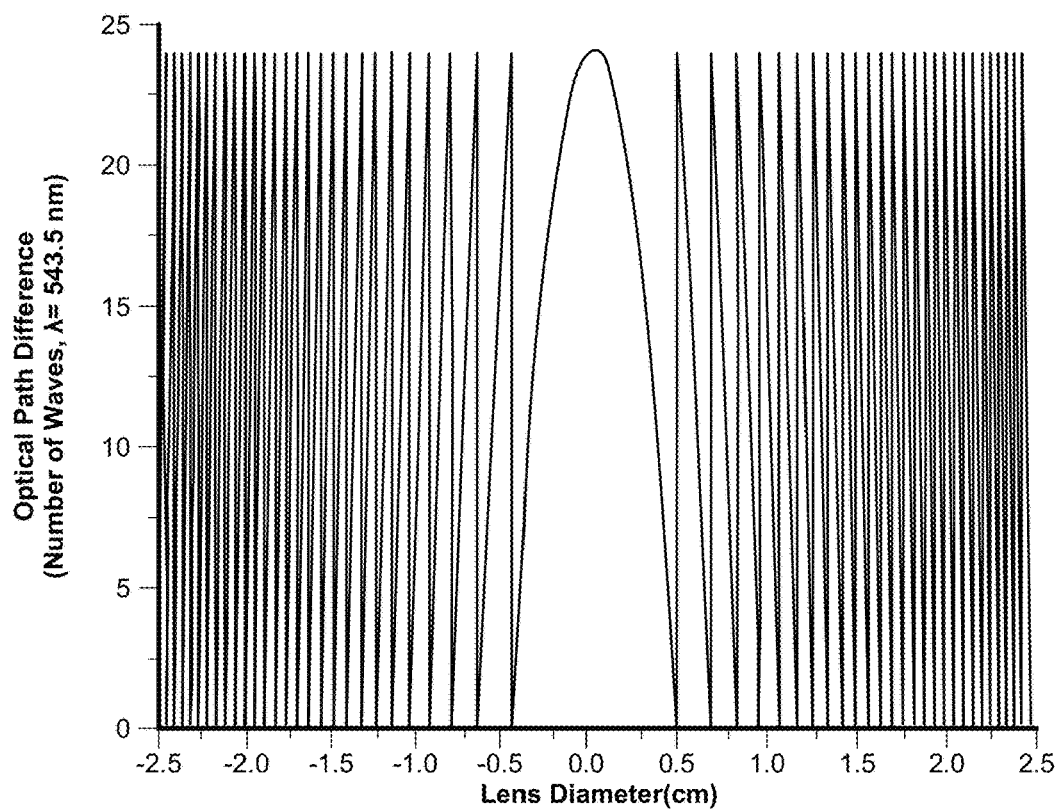
FIG. 9B is a plot showing a 2D phase map for an example large-diameter GRIN LC lens having 28 Fresnel resets according to some embodiments.

FIG. 9B illustrates a phase map of an exemplary GRIN LC lens having a total of 28 Fresnel resets that together approximate the lens characteristics of the idealized phase profile of FIG. 9A. A large number of phase steps within one wavelength of OPD (i.e., a large number of phase steps per wavelength) may be desired to produce a more accurate representation of an idealized phase profile. The 28 Fresnel resets may enable a substantial reduction in the LC cell thickness and improvement in response time. To configure a GRIN LC lens with negligible diffraction angle for near eye applications, the minimum width of Fresnel segments of the GRIN LC lens may be selected to be larger than 1.03 mm. The resets may be formed in a single GRIN LC layer (e.g., a 60 μm thick layer) or distributed in multiple stacked GRIN LC layers (e.g., three stacked 20 μm thick layers). In some examples, GRIN LC layers may be stacked to further improve the response time of the overall GRIN LC lens. By way of example, a pair of optically coupled GRIN LC lens layers, with each layer having five resets in their phase profile, may enable the resulting LC cell thickness to be reduced up to 10 times (5 resets multiplied by 2 layers) and, accordingly, the response speed may be improved by a factor of approximately 100.

Figure 10A:
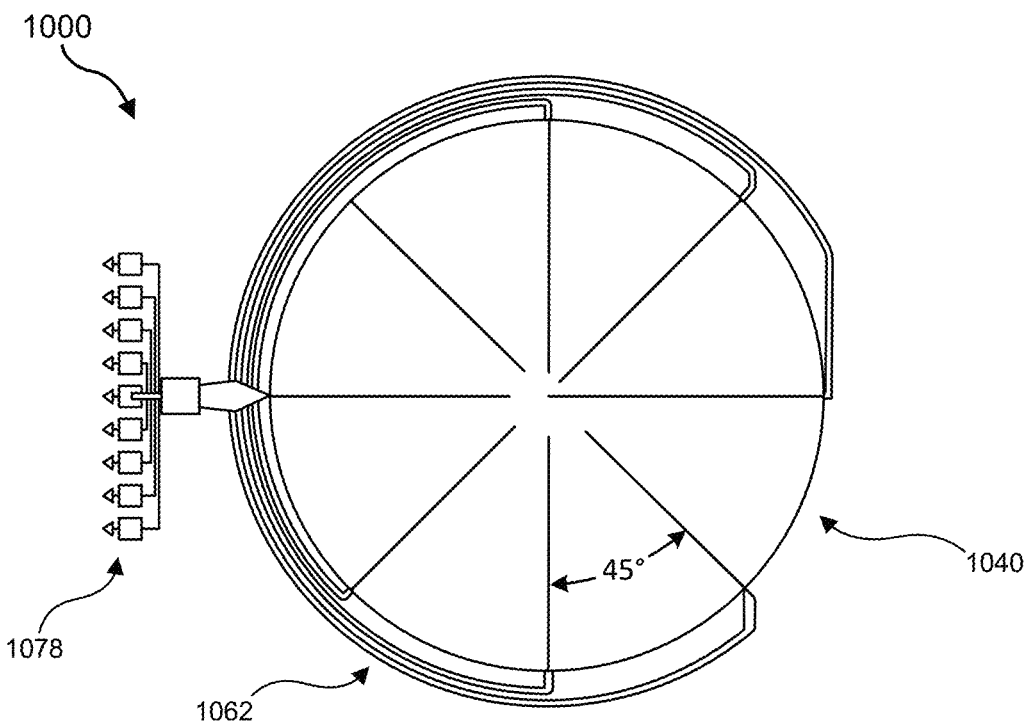
FIG. 10A illustrates an example GRIN LC system that includes an electrode array and a plurality of bus lines according to some embodiments.
Figure 10B:
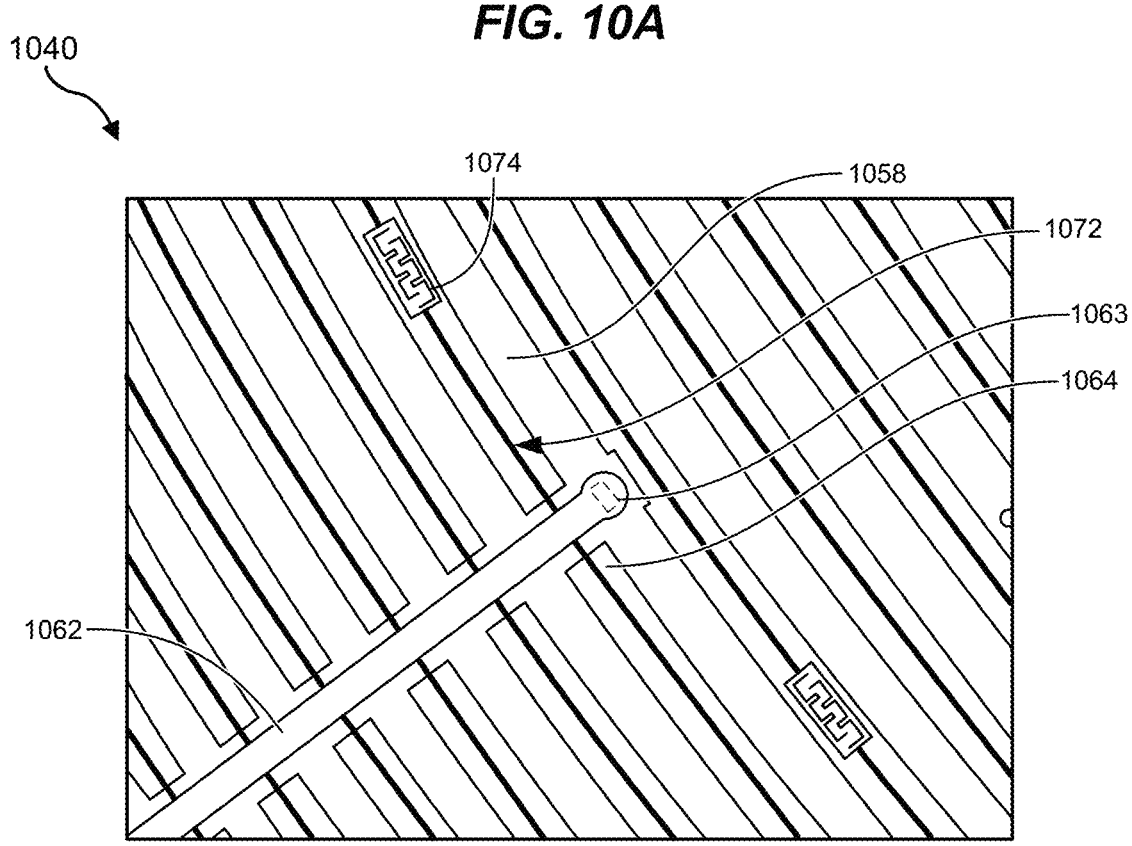
FIG. 10B shows a close-up view of a portion of the GRIN LC system illustrated in FIG. 10A according to some embodiments.

FIGS. 10A and 10B show a GRIN LC system 1000 and GRIN LC lens 1040 that includes an electrode array and bus lines according to various embodiments. As shown in FIG. 10A, GRIN LC system 1000 includes a plurality of bus lines 1062 that are electrically coupled to driving electrodes of GRIN LC lens 1040. For example, GRIN LC system 1000 may include eight bus lines 1062 as shown, with each of the eight bus 1062 lines being disposed at a different angular position about GRIN LC lens 1040. The bus lines 1062 may, for example, be evenly spaced apart from each other at regular angular intervals of approximately 45°, with each bus line extending from a peripheral position towards the center of GRIN LC lens 1040. Accordingly, portions of bus lines 1062 on GRIN LC lens 1040 may extend along radial lines located at angular positions of approximately 0°, 45°, 90°, 135°, 180°, 225°, 270°, and 315°. While GRIN LC lens 1040 shown in FIG. 10A has a substantially circular profile, GRIN LC lens 1040 may alternatively have any other suitable non-circular shape in various embodiments. Bus lines 1062 may extend between GRIN LC lens 1040 and terminals 1078, which may be connected to an external voltage source and controller (see, e.g., virtual reality engine 1345 in FIG. 13) that is configured to apply different voltages to terminals 1078 and corresponding bus lines 1062. Additionally, at least one of terminals 1078 may be coupled, via another bus line, to a common electrode (see, e.g., common electrode 468 in FIG. 4) and may apply a common voltage to the common electrode.

FIG. 10B shows a close-up view of a portion GRIN LC lens 1040 illustrated in FIG. 10A. As shown, GRIN LC lens 1040 may include a plurality of concentrically arranged driving electrodes 1058 that are separated from each other by gap regions 1072 (see, e.g., gap G1 in FIG. 4; see also gap region 672 and 772 in FIGS. 6 and 7). Adjacent driving electrodes 1058 may be electrically coupled to each other by resisters 1074 that bridge the intervening gap regions 1072 to maintain a selected voltage drop(s) between the driving electrodes 1058. Additionally, concentrically arranged floating electrodes 1064 may be disposed over portions of driving electrodes 1058 so as to overlap gap regions 1072 disposed between adjacent driving electrodes 1058. A portion of a bus line 1062 coupled to one of the illustrated driving electrodes 1058 is shown in FIG. 10B. As shown, bus line 1062 is electrically coupled to a driving electrode 1058 by a via interconnect 1063 extending directly between bus line 1062 and the corresponding driving electrode 1058. Bus line 1062 shown in FIG. 10B may be separated from other driving electrodes 1058 by an insulating layer (see, e.g., insulating layer 460 in FIG. 4).

In some examples, each bus line 1062 may be coupled to a corresponding driving electrode 1058 within each of a plurality of Fresnel segments (see, e.g., Fresnel segments FS1 and FS2 in FIG. 7; see also Fresnel segments FS1-FS5 in FIG. 8C). For example, each bus line 1062 may extend from an outer periphery of the driving electrode array of GRIN LC lens 1040 towards a center of GRIN LC lens 1040. Accordingly, in this example, each bus line 1062 may cross over each of a plurality of concentric Fresnel segments. Via interconnects, such as via interconnect 1063 shown in FIG. 10B, may electrically couple each bus line 1062 to a corresponding driving electrode 1058 within each respective Fresnel segment. Accordingly, the eight bus lines 1062 shown in FIG. 10A may be configured to simultaneously apply voltages to corresponding driving electrodes 1058 within each of a plurality of Fresnel segments.

Figure 11A:
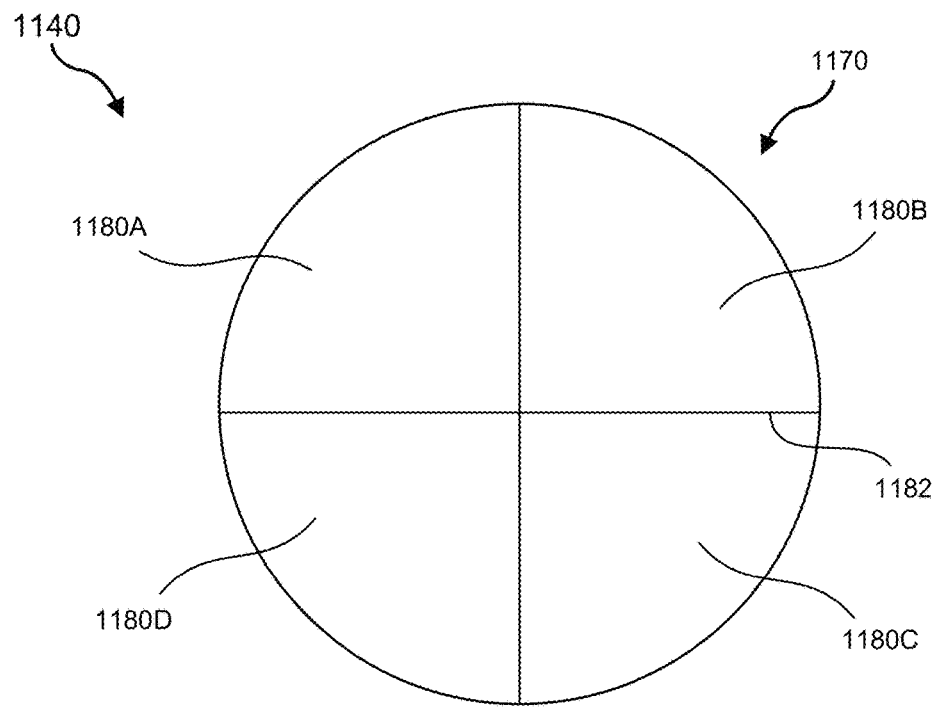
FIG. 11A illustrates an example GRIN LC lens having a driving electrode array that is divided into a plurality of driving zones according to some embodiments.
Figure 11B:
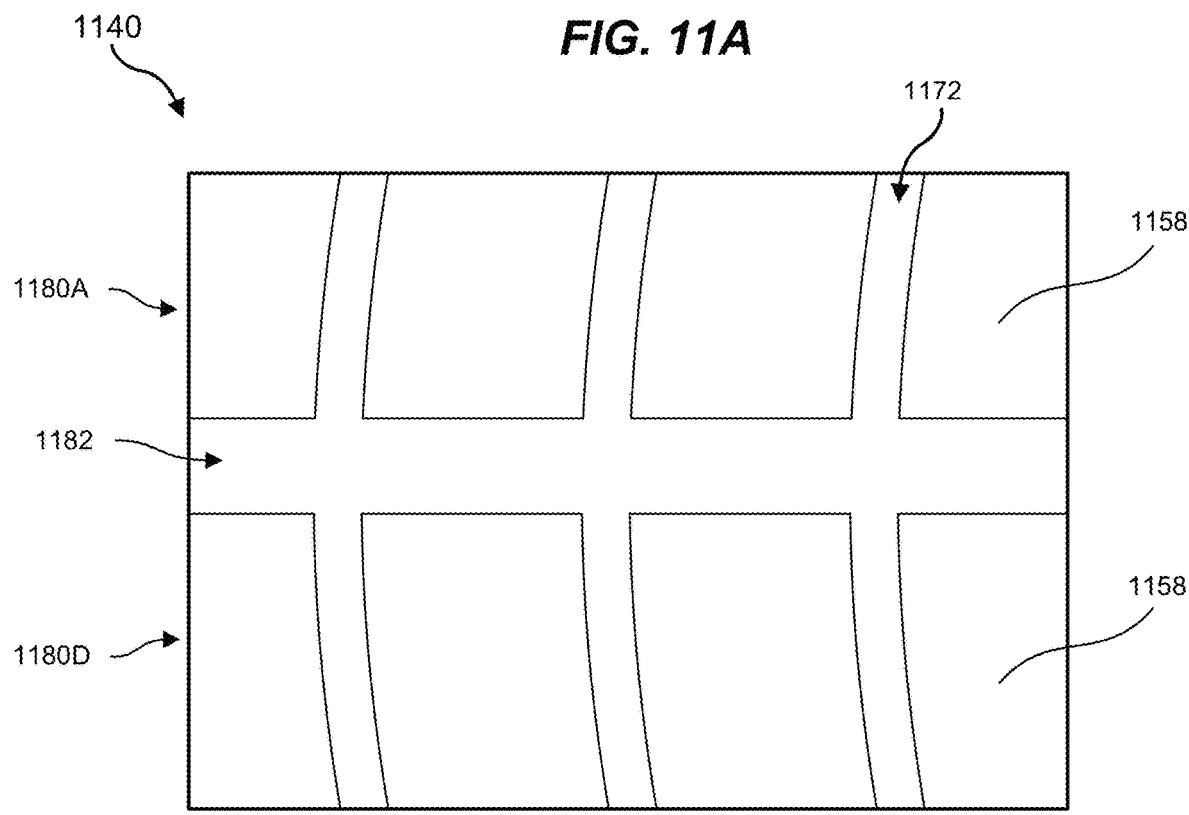
FIG. 11B shows a close-up view of a portion of the GRIN LC lens illustrated in FIG. 11A according to some embodiments.
Figure 12:
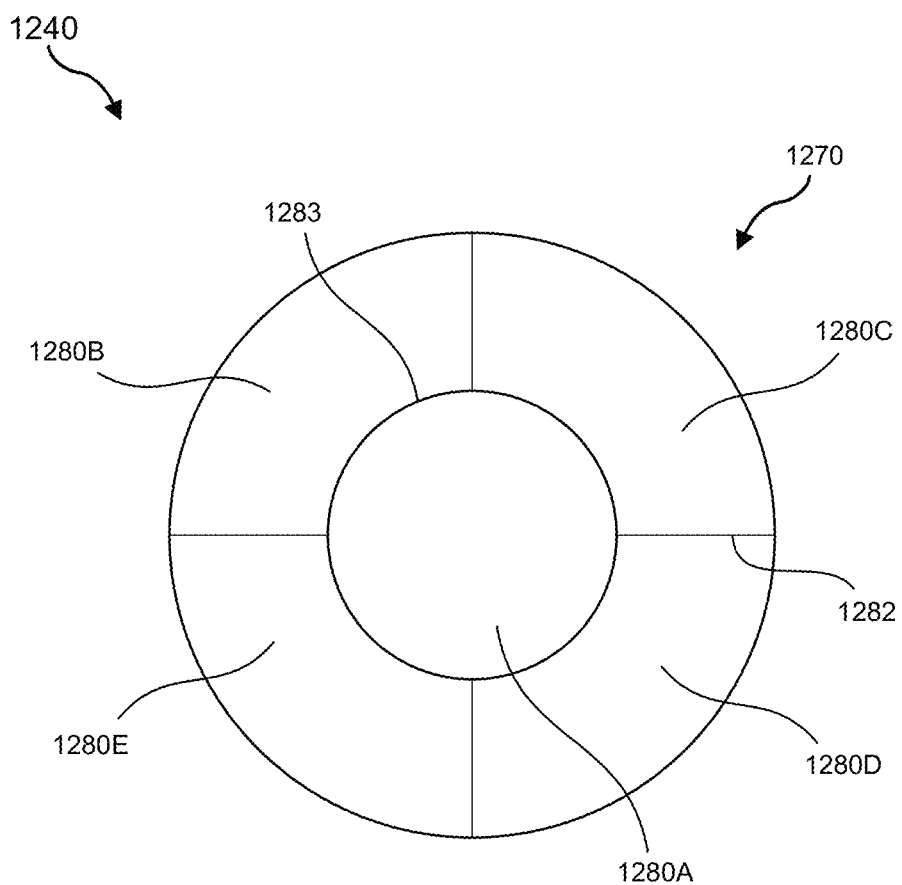
FIG. 12 illustrates an example GRIN LC lens having a driving electrode array that is divided into plurality of driving zones according to some embodiments.

FIGS. 11A-12 illustrate GRIN LC lenses having independent driving zones according to various embodiments. In some examples, a GRIN LC lens may be divided into a plurality of driving zones that may be selectively and independently operated based, for example, on the direction of a user's gaze. A GRIN LC lens may include any suitable number of driving zones.

FIG. 11A shows a GRIN LC lens 1140 having a driving electrode array 1170 (see, e.g., driving electrode arrays 670 and 770 in FIGS. 6 and 7) that is divided into plurality of driving zones 1180, including four driving zones 1180A-1180D. As shown in this figure, each of driving zones 1180A, 1180B, 1180C, and 1180D may occupy approximately one quarter of the lens area (i.e., each driving zone occupies a separate quadrant of GRIN LC lens 1140), with each of driving zones 1180A-1180D overlapping different sectors (in this case quadrants) of a liquid crystal layer (see, e.g., liquid crystal layer 442 in FIG. 4) of GRIN LC lens 1140. The overlapped sectors of the liquid crystal layer may have approximately the same shape(s) and size(s) as driving zones 1180A-1180D shown in FIG. 11A. Additionally, in the example shown in FIG. 11A, the sectors of the liquid crystal layer overlapped by driving zones 1180A-1180D may each have approximately equal sector angles (e.g., sector angles of approximately 90°).

In some examples, partition regions 1182 may extend between adjacent driving zones 1180 to prevent electrical conduction between the adjacent driving zones 1180. Partition regions 1182 may extend radially outward from a center of GRIN LC lens 1140 to respective peripheral locations, as illustrated. In at least one embodiment, driving zones 1180 may be electrically segregated from each other so they can be selectively activated by a controller. For example, driving zones 1180A-1180D may each include a plurality of driving electrodes (see, e.g., driving electrodes 658, 758, and 1058 in FIGS. 6, 7, and 10B) having partial ring shapes that are arranged concentrically. The driving electrodes may, for example, follow portions of ring-shaped paths, such as those illustrated in FIGS. 6, 7, and 10B. The driving electrodes in each driving zone 1180 may be electrically separated from driving electrodes in other driving zones 1180 by, for example, a gap or insulating layer disposed in partition regions 1182 between adjacent driving zones 1180.

FIG. 11B shows a close-up view of a portion the electrode array of GRIN LC lens 1140 illustrated in FIG. 11A. As shown in FIG. 11B, a partition region 1182 may extend between a pair of adjacent driving zones 1180, such as driving zones 1180A and 1180B. In this example, partition region 1182 may include a space and/or material (e.g., an insulating material) that electrically separates driving zone 1180A and 1180B. In some examples, gap regions 1172 disposed between driving electrodes 1158 in each zone 1180 may extend to partition region 1182 as illustrated.

In some examples, a separate plurality of bus lines (see, e.g., bus lines 1062 in FIGS. 10A and 10B) may be electrically coupled to each of driving zones 1180A-1180D. Each set of bus lines may provide a range of voltage values to respective driving electrodes 1158 of a corresponding driving zone 1180 so as to orient liquid crystals overlapping the driving zone 1180 in a desired manner. For example, each of driving zones 1180A-1180D may be configured to be separately driven by an associated set of bus lines such that an active driving zone 1180 functions as a GRIN LC lens having a desired optical power. Accordingly, selected driving zone(s) 1180 may be activated so that they are in an ON state, during which driving voltages from corresponding bus lines are applied to electrodes in the activated driving zone(s). Other driving zone(s) 1180 that are not activated may be in an OFF state, during which driving voltages are not applied to electrodes in the non-active driving zone(s). As discussed below, particular active and non-active driving zones 1180 may be selected and may change as needed to provide a suitable lens view to a user.

In some examples, the plurality of driving electrodes 1158 in each driving zone 1180 may each occupy/overlap an area having approximately the same size. As such, driving electrodes 1158 may have progressively longer and radially thinner dimensions proceeding peripherally outward. The combination of dimensions for driving electrodes at each position may result in each of driving electrodes 1158 covering approximately the same overall area. Driving electrodes 1158 may also have any other suitable dimensions, shapes, and sizes according to various embodiments. According to various embodiments, driving electrodes 1158 may each follow an arcuate path. For example, driving electrodes 1158 may each extend along a partial-circular path so as to occupy a partial-ring-shaped area within their respective driving zones 1180.

In some embodiments, each driving zone 1180 may be further divided into a plurality of Fresnel segments (see, e.g., Fresnel Segments FS1-FS5 shown in FIG. 8C). The Fresnel segments may occupy different bands or regions of their respective driving zones, with the Fresnel segments extending from the center outward. For example, the Fresnel segments may be located at radial locations within GRIN LC lens 1140 corresponding to Fresnel resets dictated by a desired phase map for the lens (see, e.g., phase maps illustrated in FIGS. 8B and 9B). Bus lines that provide voltages to a particular driving zone 1180 may each be electrically coupled to corresponding driving electrodes 1158 within Fresnel segments of the driving zone 1180.

By activating selected driving zones 1180 of GRIN LC lens 1140, rather than activating the entire lens area all at one, a response time of a foveal region of the lens may be substantially reduced. For example, because driving zones 1180 each take up an area equivalent to only a portion of an aperture of GRIN LC lens 1140 (e.g., each driving zone 1180 may occupy approximately one quarter of the aperture area), the response time of each driving zone 1180 may be reduced in comparison to a GRIN LC lens having a driving electrode array spanning the entire lens aperture. In some examples, all of driving zones 1180A-1180D may be activated simultaneously to produce a desired lens profile across substantially the entire aperture region of GRIN LC lens 1140. The response time may also be reduced in comparison to more conventional GRIN LC lenses, even when a plurality of driving zones 1180 are operated simultaneously, due to the reduced size of the driving zones 1180 relative to the overall lens aperture size.

In various examples, the number of Fresnel segments within each driving zone may also be reduced in comparison to GRIN LC lenses that do not include distinct driving zones while maintaining acceptable lens response times. Accordingly, the inclusion of multiple separate driving zones 1180 and/or Fresnel segments within driving zones 1180 may ensure that changes in lens optical power may take less time and/or may be less noticeable overall to a user during lens transitions. Additionally, the discretely partitioned driving zones may enable manufacturing of GRIN LC lenses having increased diameters since the smaller driving zones 1180 may exhibit significantly shorter response times.

According to at least one embodiment, individual driving zones 1180 may be selectively driven based on an orientation and/or focus of the user's eyes. For example, one or more driving zones 1180 that are aligned with a user's gaze direction may be activated while other zones are deactivated or maintained in a previous state. In some examples, a system that includes GRIN LC lens 1140 may also have an eye-tracking system that is configured to detect a gaze direction for one or both of a user's eyes. The eye-tracking system may determine, for example, that the pupil of a user's eye is directed toward, or substantially toward, one of driving zones 1180 such that the user's field of view is generally centered at that driving zone 1180.

For example, a user's eye gaze direction may be centered at an area within driving zone 1180A. An eye-tracking system (e.g., eye-tracking system 236 in FIG. 13) may detect the user's eye gaze direction and a controller (e.g., virtual reality engine 1345 in FIG. 13) of the GRIN LC system may apply voltages to driving electrodes within driving zone 1180A to provide an active lens view with a selected diopter in driving zone 1180A. In at least one example, more than one driving zone 1180 may be driven simultaneously. For example, if the user's eye gaze is determined to be directed toward a region within and/or close to two or more driving zones 1180, then each of the two or more driving zones (e.g., driving zones 1180A and 1180B) may be actively driven simultaneously. Accordingly, the view may appear to be continuous and properly focused from the user's perspective, even when the user gaze direction transitions between the two or more driving zones (e.g., between driving zones 1180A and 1180B).

According to at least one embodiment, the eye-tracking system may determine both a location and direction of movement of the user's gaze. The direction of eye gaze movement may be used by the eye-tracking system to determine a likelihood that the user's eye gaze direction is approaching a new driving zone 1180 at a particular time. For example, if the user's gaze is directed toward driving zone 1180A and is in close proximity to and/or moving toward driving zone 1180B, then driving zone 1180B may be activated such that driving zones 1180A and 1180B are simultaneously driven. In some examples, other suitable factors may be utilized to determine and/or predict user eye gaze locations (e.g., display content having visual cues, etc.)

FIG. 12 illustrates a GRIN LC lens 1240 having a plurality of independent driving zones 1280 according to some embodiments. As shown in FIG. 12, GRIN LC lens 1240 includes a driving electrode array 1270 that is divided into five driving zones 1280, including driving zones 1280A-1280E.

In comparison to the example GRIN LC lens 1140 illustrated in FIG. 11A, which includes a plurality of driving zones 1180 that intersect at the lens center, GRIN LC lens 1240 has a central driving zone 1280A covering a central region. For example, central driving zone 1280A may be substantially centered about a center point of GRIN LC lens 1240. Central driving zone 1280A may include a plurality of concentric ring-shaped driving electrodes that are arranged as described herein (see, e.g., FIGS. 6, 7, and 8C). In the example illustrated in FIG. 12, a plurality of outer driving zones, such as driving zones 1280B, 1280C, 1280D, and 1280E, may also surround driving zone 1280A. In some examples, partition region 1283 may surround central driving zone 1280A, with partition region 1283 being defined between central driving zone 1280A and each of outer driving zones 1280B-1280E. Additionally, partition regions 1282 may extend between adjacent pairs of outer driving zones 1280B-1280E. In at least one example, partition regions 1282 may extend radially outward from the inner partition region 1283 to respective peripheral locations, as illustrated. Each of driving zones 1280A-1280E may overlap different corresponding sectors of a liquid crystal layer (see, e.g., liquid crystal layer 442 in FIG. 4) of GRIN LC lens 1240. The sectors of the liquid crystal layer overlapped by driving zones 1280A-1280E may have approximately the same shapes as driving zones 1280A-1280E shown in FIG. 12.

Driving zone 1280A may be located at a central location that is frequently viewed by a wearer. Accordingly, driving zone 1280A may be activated frequently (constantly in some examples) while driving zones 1280B, 1280C, 1280D, and 1280E are maintained in an inactive/OFF state. One or more of driving zones 1280B, 1280C, 1280D, and 1280E may be activated as needed when the user's gaze is determined to be focused at or near one or more of these zones. In some examples, centrally-located driving zone 1280A may be active a substantial portion of the time that GRIN LC lens 1240 is used. In some examples, when the user's gaze is directed near or beyond an outer periphery of driving zone 1280A, driving zone 1280A may be kept in an active/ON state while one or more of driving zones 1280B, 1280C, 1280D, and 1280E is also simultaneously driven (i.e., activated or turned ON) to accommodate the user's gaze.

Figure 13:
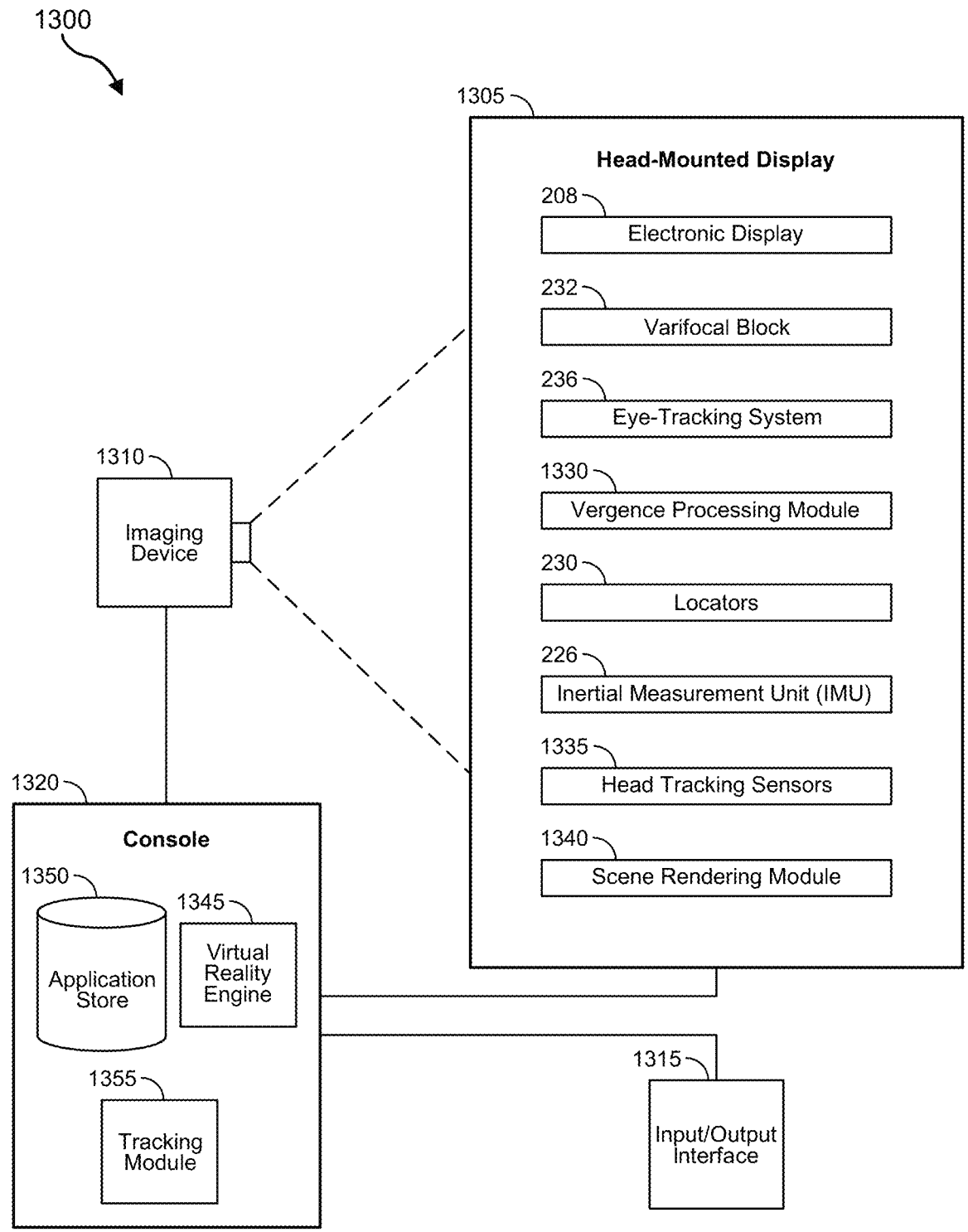
FIG. 13 is an illustration of an exemplary varifocal system that may be used in connection with embodiments of this disclosure.

FIG. 13 illustrates an exemplary varifocal system 1300 that includes various aspects of disclosed embodiments. Varifocal system 1300 may be used for a virtual reality system, an augmented reality system, a mixed reality system, or some combination thereof. As shown in FIG. 13, varifocal system 1300 may include an imaging device 1310, a console 1320, an input/output interface 1315, and a head-mounted display (HMD) 1305. Although FIG. 13 shows a single HMD 1305, a single imaging device 1310, and a single input/output interface 1315, any suitable number of these components/subsystems may be included in varifocal system 1300. HMD 1305 may act as a virtual reality, augmented reality, and/or a mixed reality HMD. Various components and/or subsystems of varifocal system 1300 may be physically separated or combined together within a common device and/or assembly. For example, two or more of imaging device 1310, console 1320, input/output interface 1315, and head-mounted display (HMD) 1305 may be combined within an HMD assembly that is worn on a user's head.

HMD 1305 may present content to a user. In some examples, HMD 1305 may be an embodiment of HMD 200 described above with reference to FIGS. 2A and 2B. Example content includes images, video, audio, or some combination thereof. Audio content may be presented via a separate device (e.g., speakers and/or headphones) external to HMD 1305 that receives audio information from HMD 1305, console 1320, or both. HMD 1305 may include an electronic display 208, a varifocal block 232 having one or more GRIN LC lenses as disclosed herein (see, e.g., FIGS. 3-12), and an eye-tracking system 236 (described above with reference to FIG. 2B). Additionally, HMD 1305 may include one or more locators 230, an internal measurement unit (IMU) 226 (described above with reference to FIG. 2A), a vergence processing module 1330, head tracking sensors 1335, and a scene rendering module 1340.

Eye-tracking system 236 may track eye position and eye movement of a user of HMD 1305. A camera or other optical sensor, which may be part of eye-tracking system 236 inside HMD 1305, may capture image information of a user's eye(s), and eye-tracking system 236 may use the captured information to determine interpupillary distance, interocular distance, a three dimensional (3D) position of each eye relative to HMD 1305 (e.g., for distortion adjustment purposes), including a magnitude of torsion and rotation (i.e., roll, pitch, and yaw), and gaze directions for each eye.

In some embodiments, infrared light may be emitted within HMD 1305 and reflected from each eye. The reflected light may be received or detected by the camera and analyzed to extract eye rotation from changes in the infrared light reflected by each eye. Many methods for tracking the eyes of a user may be used by eye-tracking system 236. Accordingly, eye-tracking system 236 may track up to six degrees of freedom of each eye (i.e., 3D position, roll, pitch, and yaw), and at least a subset of the tracked quantities may be combined from two eyes of a user to estimate a gaze point (i.e., a 3D location or position in the virtual scene where the user is looking). For example, eye-tracking system 236 may integrate information from past measurements, measurements identifying a position of a user's head, and 3D information describing a scene presented by electronic display 208. Thus, information for the position and orientation of the user's eyes may be used to determine the gaze point in a virtual scene presented by HMD 1305 where the user is currently looking.

Varifocal block 232 may adjust its focal length (i.e., optical power) by adjusting a focal length of one or more varifocal structures. As noted above with reference to FIGS. 6A-6C, based on the eye-tracking information, varifocal block 232 may activate one or more LC lenses corresponding to the eye position for each eye of the user, and adjust its focal length by adjusting the voltages applied to the electrodes of the one or more activated LC lenses. Varifocal block 232 may adjust its focal length responsive to instructions from console 1320. Note that a varifocal tuning speed of a varifocal structure is limited by a tuning speed of the LC lenses. Varifocal block 232 may deactivate other LC lenses which are not corresponding to the eye position for each eye of the user, thereby reducing the power consumption of varifocal block 232. In addition, varifocal block 232 may determine a shift between the center of the activated LC lens(es) and the center of the adaptive lens assembly (i.e., a lens center shift).

Vergence processing module 1330 may determine a vergence distance of a user's gaze based on the gaze point or an estimated intersection of the gaze lines determined by eye-tracking system 236. Vergence is the simultaneous movement or rotation of both eyes in opposite directions to maintain single binocular vision, which is naturally and automatically performed by the human eye. Thus, a location where a user's eyes are verged is where the user is currently looking and is also typically the location where the user's eyes are currently focused. For example, vergence processing module 1330 may triangulate the gaze lines to estimate a distance or depth from the user associated with intersection of the gaze lines. Then the depth associated with intersection of the gaze lines may be used as an approximation for the accommodation distance, which identifies a distance from the user where the user's eyes are directed. Thus, the vergence distance may allow determination of a location where the user's eyes should be focused.

Locators 230 may be objects located in specific positions on HMD 1305 relative to one another and relative to a specific reference point on HMD 1305. A locator 230 may be a light emitting diode (LED), a corner cube reflector, a reflective marker, a type of light source that contrasts with an environment in which HMD 1305 operates, or some combination thereof.

IMU 226 may be an electronic device that generates fast calibration data based on measurement signals received from one or more of head tracking sensors 1335, which generate one or more measurement signals in response to motion of HMD 1305. Examples of head tracking sensors 1335 include accelerometers, gyroscopes, magnetometers, other sensors suitable for detecting motion, correcting error associated with IMU 226, or some combination thereof.

Based on the measurement signals from head tracking sensors 1335, IMU 226 may generate fast calibration data indicating an estimated position of HMD 1305 relative to an initial position of HMD 1305. For example, head tracking sensors 1335 may include multiple accelerometers to measure translational motion (forward/back, up/down, left/right) and multiple gyroscopes to measure rotational motion (e.g., pitch, yaw, and roll). IMU 226 may, for example, rapidly sample the measurement signals and calculate the estimated position of HMD 1305 from the sampled data. Alternatively, IMU 226 may provide the sampled measurement signals to console 1320, which determines the fast calibration data.

IMU 226 may additionally receive one or more calibration parameters from console 1320. As further discussed below, the one or more calibration parameters may be used to maintain tracking of HMD 1305. Based on a received calibration parameter, IMU 226 may adjust one or more of the IMU parameters (e.g., sample rate). In some embodiments, certain calibration parameters may cause IMU 226 to update an initial position of the reference point to correspond to a next calibrated position of the reference point. Updating the initial position of the reference point as the next calibrated position of the reference point may help to reduce accumulated error associated with determining the estimated position. The accumulated error, also referred to as drift error, may cause the estimated position of the reference point to "drift" away from the actual position of the reference point over time.

Scene rendering module 1340 may receive contents for the virtual scene from a virtual reality engine 1345 and provide display content for display on electronic display 208. Scene rendering module 1340 may include a hardware central processing unit (CPU), graphics processing unit (GPU), and/or a controller/microcontroller. Additionally, scene rendering module 1340 may adjust the content based on information from eye-tracking system 236, vergence processing module 1330, IMU 226, and head tracking sensors 1335. Scene rendering module 1340 may determine a portion of the content to be displayed on electronic display 208, based on one or more of eye-tracking system 236, tracking module 1355, head tracking sensors 1335, or IMU 226. For example, scene rendering module 1340 may determine a virtual scene, or any part of the virtual scene, to be displayed to the viewer's eyes. Scene rendering module 1340 may also dynamically adjust the displayed content based on the real-time configuration of varifocal block 232. In addition, based on the information of the determined lens center shift provided by varifocal block 232, scene rendering module 1340 may determine a shift of the virtual scene to be displayed on electronic display 208.

Imaging device 1310 may provide a monitoring function for HMD 1305 and may generate slow calibration data in accordance with calibration parameters received from console 1320. Slow calibration data may include one or more images showing observed positions of locators 230 that are detectable by imaging device 1310. Imaging device 1310 may include one or more cameras, one or more video cameras, other devices capable of capturing images including one or more locators 230, or some combination thereof. Slow calibration data may be communicated from imaging device 1310 to console 1320, and imaging device 1310 may receive one or more calibration parameters from console 1320 to adjust one or more imaging parameters (e.g., focal length, focus, frame rate, ISO, sensor temperature, shutter speed, aperture, etc.).

Input/output interface 1315 may be a device that allows a user to send action requests to console 1320. An action request may be a request to perform a particular action. For example, an action request may be used to start or end an application or to perform a particular action within the application. Input/output interface 1315 may include one or more input devices such as a keyboard, a mouse, a game controller, or any other suitable device. An action request received by input/output interface 1315 may be communicated to console 1320, which performs an action corresponding to the action request. In some embodiments, input/output interface 1315 may provide haptic feedback to the user in accordance with instructions received from console 1320. For example, haptic feedback may be provided by input/output interface 1315 when an action request is received, or console 1320 may communicate instructions to input/output interface 1315 causing input/output interface 1315 to generate haptic feedback when console 1320 performs an action.

Console 1320 may provide content to HMD 1305 for presentation to the user in accordance with information received from imaging device 1310, HMD 1305, or input/output interface 1315. In one embodiment, as shown in FIG. 13, console 1320 may include an application store 1350, a tracking module 1355, and a virtual reality engine 1345, etc.

Application store 1350 may store one or more applications for execution by console 1320. An application may be a group of instructions that, when executed by a processor, generate content for presentation to the user. Content generated by an application may be in response to inputs received from the user via movement of HMD 1305 and/or input/output interface 1315. Examples of applications include gaming applications, conferencing applications, video playback applications, and/or other suitable applications.

Tracking module 1355 may calibrate varifocal system 1300 using one or more calibration parameters and may adjust one or more calibration parameters to reduce error in determining position of HMD 1305. For example, tracking module 1355 may adjust the focus of imaging device 1310 to obtain a more accurate position for observed locators 230 on HMD 1305. Moreover, calibration performed by tracking module 1355 may also account for information received from IMU 226. Additionally, when tracking of HMD 1305 is lost (e.g., imaging device 1310 loses line of sight of at least a threshold number of locators 230), tracking module 1355 may re-calibrate some or all of varifocal system 1300 components.

Additionally, tracking module 1355 may track the movement of HMD 1305 using slow calibration information from imaging device 1310, and determine positions of a reference point on HMD 1305 using observed locators from the slow calibration information and a model of HMD 1305. Tracking module 1355 may also determine positions of the reference point on HMD 1305 using position information from the fast calibration information from IMU 226 on HMD 1305. Additionally, tracking module 1355 may use portions of the fast calibration information, the slow calibration information, or some combination thereof, to predict a future location of HMD 1305, which is provided to virtual reality engine 1345.

Virtual reality engine 1345 may function as a controller to execute applications within varifocal system 1300 and may receive position information, acceleration information, velocity information, predicted future positions, or some combination thereof for HMD 1305 from tracking module 1355. Based on the received information, virtual reality engine 1345 may determine content to provide to HMD 1305 for presentation to the user, such as a virtual scene, one or more virtual objects to overlay onto a real-world scene, etc. In some embodiments, virtual reality engine 1345 may maintain focal capability information of varifocal block 232. Focal capability information is information that describes what focal distances are available to varifocal block 232. Focal capability information may include, e.g., a range of focus that varifocal block 232 is able to accommodate (e.g., 0 to 4 diopters) and/or combinations of settings for each activated LC lens that map to particular focal planes. In some examples, virtual reality engine 1345 may operate a GRIN LC lens(es) of varifocal block 232 by controlling voltages applied to driving electrodes and/or common electrodes of the GRIN LC lens(es). In some examples, virtual reality engine 1345 may be configured to operate individual driving zones by applying a different voltage to each driving electrode electrically coupled to a bus line of a plurality of bus lines for each driving zone.

Virtual reality engine 1345 may provide information to varifocal block 232, such as the accommodation and/or convergence parameters including what focal distances are available to varifocal block 232. Virtual reality engine 1345 may generate instructions for varifocal block 232 that cause varifocal block 232 to adjust its focal distance to a particular location. Virtual reality engine 1345 may generate the instructions based on focal capability information and, e.g., information from vergence processing module 1330, IMU 226, and head tracking sensors 1335, and provide the instructions to varifocal block 232 to configure and/or adjust adaptive assembly 232. Virtual reality engine 1345 may use the information from vergence processing module 1330, IMU 226, and/or head tracking sensors 1335 to select a focal plane to present content to the user. Additionally, virtual reality engine 1345 may perform an action within an application executing on console 1320 in response to an action request received from input/output interface 1315 and may provide feedback to the user that the action was performed. The provided feedback may, for example, include visual and/or audible feedback via HMD 1305 and/or haptic feedback via input/output interface 1315.

Figure 14:
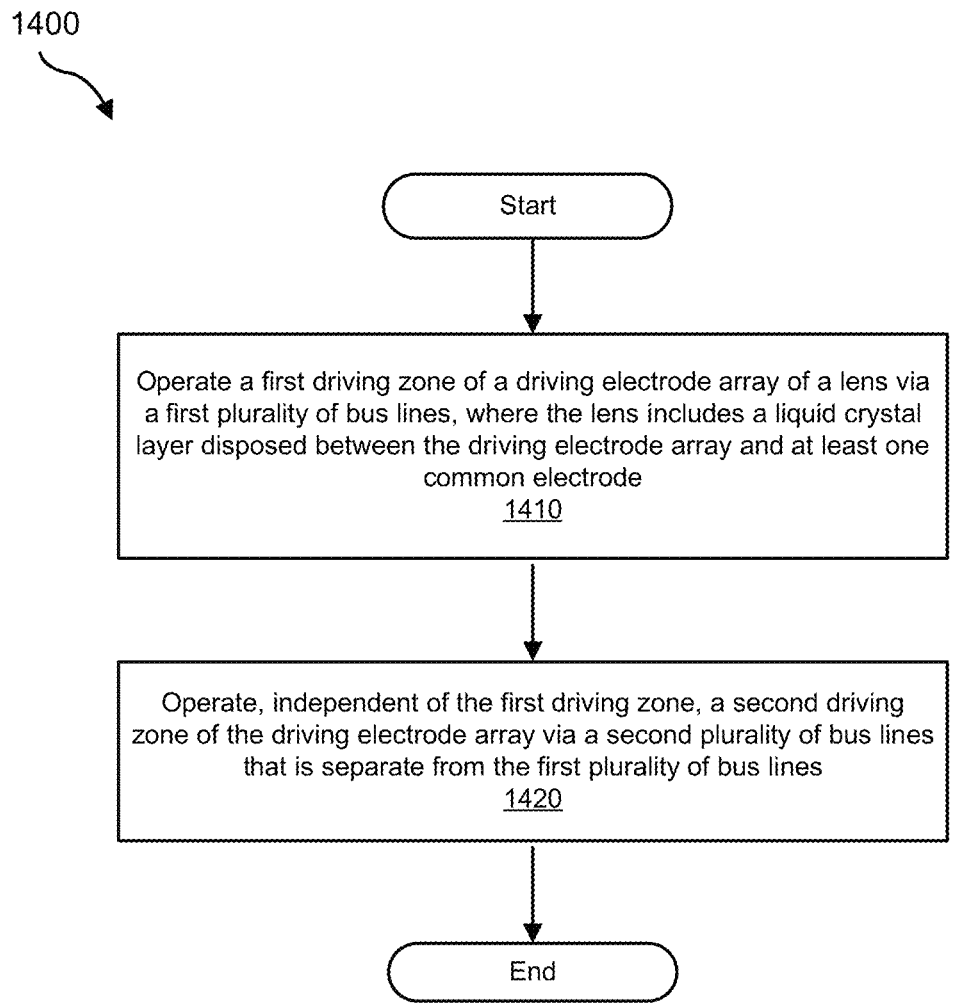
FIG. 14 is a flow diagram of an exemplary method for operating a GRIN LC lens according to some embodiments.

FIG. 14 is a flow diagram of an exemplary method 1400 for operating a GRIN LC lens in accordance with embodiments of this disclosure. As illustrated in FIG. 14, at step 1410, a first driving zone of a driving electrode array of a lens may be operated via a first plurality of bus lines. For example, at least one of driving zones 1180A-1180D, such as driving zone 1180A, of GRIN LC lens 1140 may be operated via a first plurality of bus lines coupled to driving zone 1180A (see, e.g., bus lines 1062 in FIGS. 11A and 11B; see also FIGS. 4-7, 10A, 10B, and 12).

In this example, the lens may include a liquid crystal layer disposed between the driving electrode array and at least one common electrode. For example, GRIN LC lens 440 may include a liquid crystal layer 442 disposed between driving electrodes 458 of a driving electrode array and a common electrode 468 (see FIG. 4; see also FIGS. 3, 6, 7, and 10A-12). In some examples, the first driving zone may include a plurality of driving electrodes consecutively arranged along a radial direction extending from a central region of the lens (see, e.g., driving electrodes 1158 in FIG. 11B; see also FIGS. 6, 7, 10B, 11A, and 12). Additionally, adjacent driving electrodes of the first driving zone may be coupled to each other by a resistor (see, e.g., resistors 674 in FIG. 6; see also FIGS. 7 and 10B).

At step 1420 in FIG. 14, a second driving zone of the driving electrode array may be operated, independent of the first driving zone, via a second plurality of bus lines that is separate from the first plurality of bus lines. For example, another one of driving zones 1180A-1180D, such as driving zone 1180B, may be operated via a second plurality of bus lines coupled to driving zone 1180B (see FIGS. 11A and 11B; see also FIG. 12). In various embodiments, an eye-tracking system, such as eye-tracking system 236 (see, e.g., FIGS. 2B and 13), may be used to determine a user's eye gaze direction and/or to predict an upcoming eye gaze direction based on, for example, user eye movement, display content (e.g., display content having visual cues), etc.

As described herein, the disclosed display devices and systems may include GRIN LC lenses having electrode arrays that are partitioned into multiple independently-operable driving zones covering different portions of the lenses. The driving zones may be electrically separated from each other so that they can be selectively activated by a controller. For example, one or more driving zones aligned with a user's gaze direction may be activated (i.e., put in an ON state) via application of voltages within the zone(s), while other driving zones may be deactivated (i.e., put in an OFF state) or maintained in a previous state. The display device may include an eye-tracking system to detect a gaze direction for each of a user's eyes, enabling selective targeting of active and inactive driving zones. By activating selected driving zones of the lens, rather than activating the entire driving electrode array of the GRIN LC lens all at one, a response time of a foveal region of the lens may be substantially reduced. Accordingly, changes in the lens shape may be less noticeable to a user during transitions in lens focus. Additionally, the discretely partitioned zones may enable manufacturing of GRIN LC lenses having increased diameters.

EXAMPLE EMBODIMENTS

Example 1: A lens system includes a lens having a liquid crystal layer and a driving electrode array disposed on a first side of the liquid crystal layer, the driving electrode array having a plurality of driving zones that are independently operable. The plurality of driving zones each include a plurality of driving electrodes consecutively arranged along a radial direction extending from a central region of the lens, and adjacent driving electrodes in a driving zone of the plurality of driving zones are coupled to each other by a resistor. The lens further includes i) at least one common electrode disposed on a second side of the liquid crystal layer opposite the driving electrode array and ii) a plurality of bus lines coupled to each of the plurality of driving zones.

Example 2: The lens system of Example 1, further including an eye-tracking system configured to determine a gaze direction of a user, where the controller is further configured to operate at least one driving zone of the plurality of driving zones based on the gaze direction of the user.

Example 3: The lens system of any of Examples 1 and 2, where i) each of the plurality of bus lines coupled to a driving zone of the plurality of driving zones is electrically coupled to different driving electrode of the plurality of driving electrodes in the driving zone, and ii) the controller is configured to operate the driving zone by applying a different voltage to each driving electrode electrically coupled to a bus line of the plurality of bus lines.

Example 4: The lens system of any of Examples 1-3, where each driving zone is electrically separated from other driving zones of the plurality of driving zones.

Example 5: The lens system of any of Examples 1-4, where the plurality of driving electrodes in a driving zone are electrically coupled to each other via the resistors coupling adjacent driving electrodes.

Example 6: The lens system of any of Examples 1-5, where a resistor coupling two adjacent driving electrodes is configured to maintain a voltage difference between the two adjacent driving electrodes during operation.

Example 7: The lens system of any of Examples 1-6, where the plurality of driving zones includes at least four driving zones.

Example 8: The lens system of any of Examples 1-7, where the plurality of driving zones each overlap different sectors of the liquid crystal layer.

Example 9: The lens system of Example 8, where the sectors overlapped by the plurality of driving zones have approximately equal sector angles.

Example 10: The lens system of any of Examples 1-9, where the plurality of driving zones includes a central driving zone surrounded by a plurality of outer driving zones.

Example 11: The lens system of Example 10, where the plurality of outer driving zones each extend from the central driving zone to a periphery of the driving electrode array.

Example 12: The lens system of any of Examples 1-11, where the plurality of driving electrodes in a driving zone each overlap an area having approximately the same size.

Example 13: The lens system of any of Examples 1-12, where adjacent driving electrodes are separated from each other by a gap region extending between the adjacent driving electrodes.

Example 14: The lens system of any of Examples 1-13, further including a floating electrode array overlapping the driving electrode array, where the floating electrode array is disposed between the driving electrode array and the liquid crystal layer and is separated from the driving electrode array by a dielectric layer.

Example 15: The lens system of Example 14, where the floating electrode array includes a plurality of floating electrodes that overlap gap regions between adjacent driving electrodes of the driving electrode array.

Example 16: The lens system of any of Examples 1-15, where each of the plurality of bus lines coupled to a driving zone of the plurality of driving zones is electrically coupled to a different driving electrode of the plurality of driving electrodes in the driving zone.

Example 17: The lens system of Example 16, where each of the driving electrodes electrically coupled to a bus line of the plurality of bus lines in the driving zone is located at a different radial distance relative to the central region of the lens.

Example 18: The lens system of any of Examples 1-17, where each of the plurality of driving electrodes in a driving zone of the plurality of driving zones extends along an arcuate path.

Example 19: A method includes operating a first driving zone of a driving electrode array of a lens via a first plurality of bus lines, wherein i) the lens includes a liquid crystal layer disposed between the driving electrode array and at least one common electrode, ii) the first driving zone has a plurality of driving electrodes consecutively arranged along a radial direction extending from a central region of the lens, and iii) adjacent driving electrodes of the first driving zone are coupled to each other by a resistor. The method further includes operating, independent of the first driving zone, a second driving zone of the driving electrode array via a second plurality of bus lines that is separate from the first plurality of bus lines.

Example 20: A lens includes a liquid crystal layer and a driving electrode array disposed on a first side of the liquid crystal layer, the driving electrode array having a plurality of driving zones that are independently operable. The plurality of driving zones each include a plurality of driving electrodes consecutively arranged along a radial direction extending from a central region of the lens, and adjacent driving electrodes in a driving zone of the plurality of driving zones are coupled to each other by a resistor. The lens further includes i) at least one common electrode disposed on a second side of the liquid crystal layer opposite the driving electrode array and ii) a plurality of bus lines coupled to each of the plurality of driving zones.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1500 in FIG. 15) or that visually immerses a user in an artificial reality (such as, e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
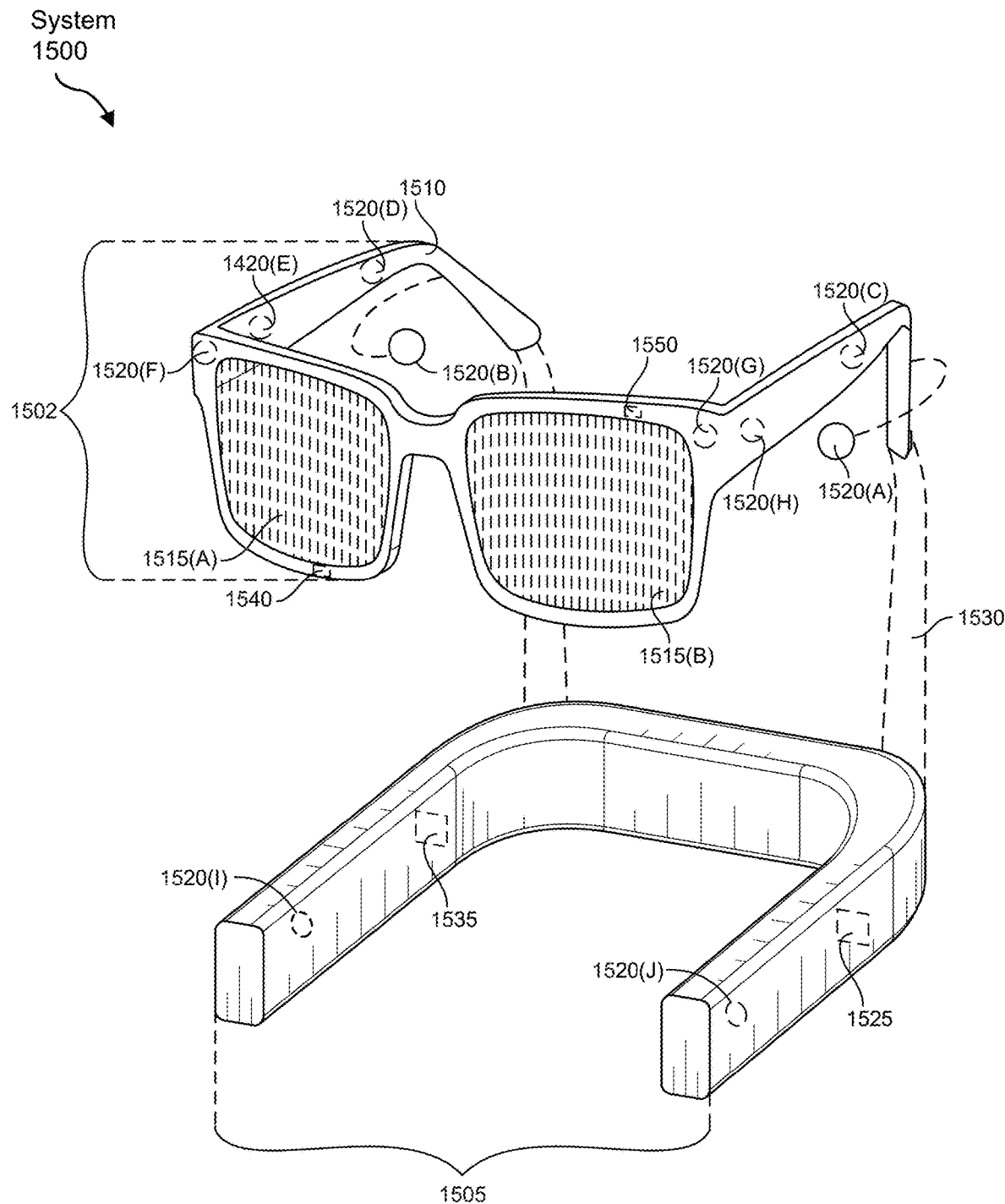
FIG. 15 is an illustration of exemplary augmented-reality glasses that may be used in connection with embodiments of this disclosure.
Figure 16:
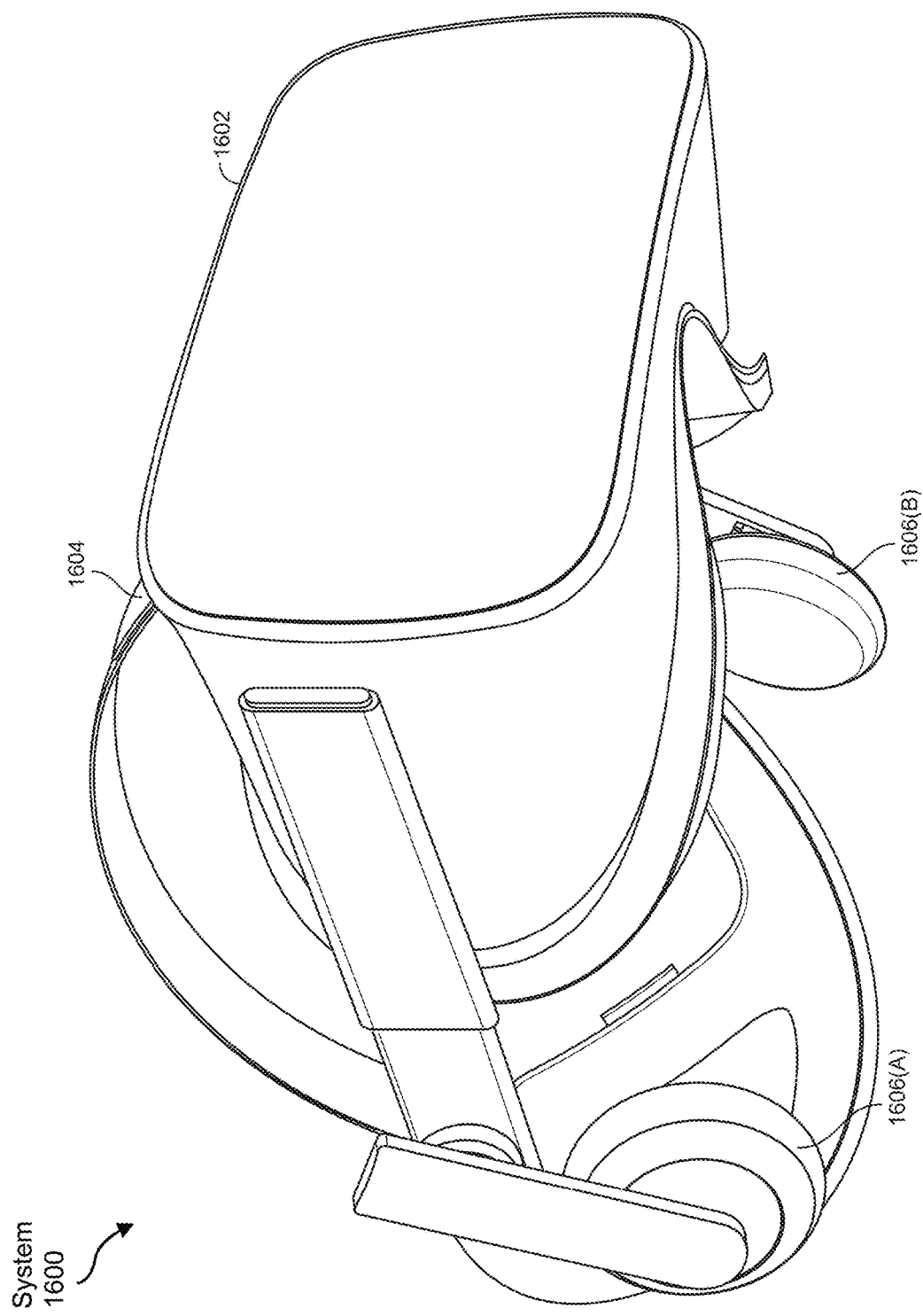
FIG. 16 is an illustration of an exemplary virtual-reality headset that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

In some examples, augmented-reality system 1500 may also include a microphone array with a plurality of acoustic transducers 1520(A)-1520(J), referred to collectively as acoustic transducers 1520. Acoustic transducers 1520 may represent transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(J) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a BLUETOOTH connection). In still other embodiments, acoustic transducers 1520(A) and 1520(B) may not be used at all in conjunction with augmented-reality system 1500.

Acoustic transducers 1520 on frame 1510 may be positioned in a variety of different ways, including along the length of the temples, across the bridge, above or below display devices 1515(A) and 1515(B), or some combination thereof. Acoustic transducers 1520 may also be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1500 and/or virtual-reality system 1600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1500 and/or virtual-reality system 1600 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 17:
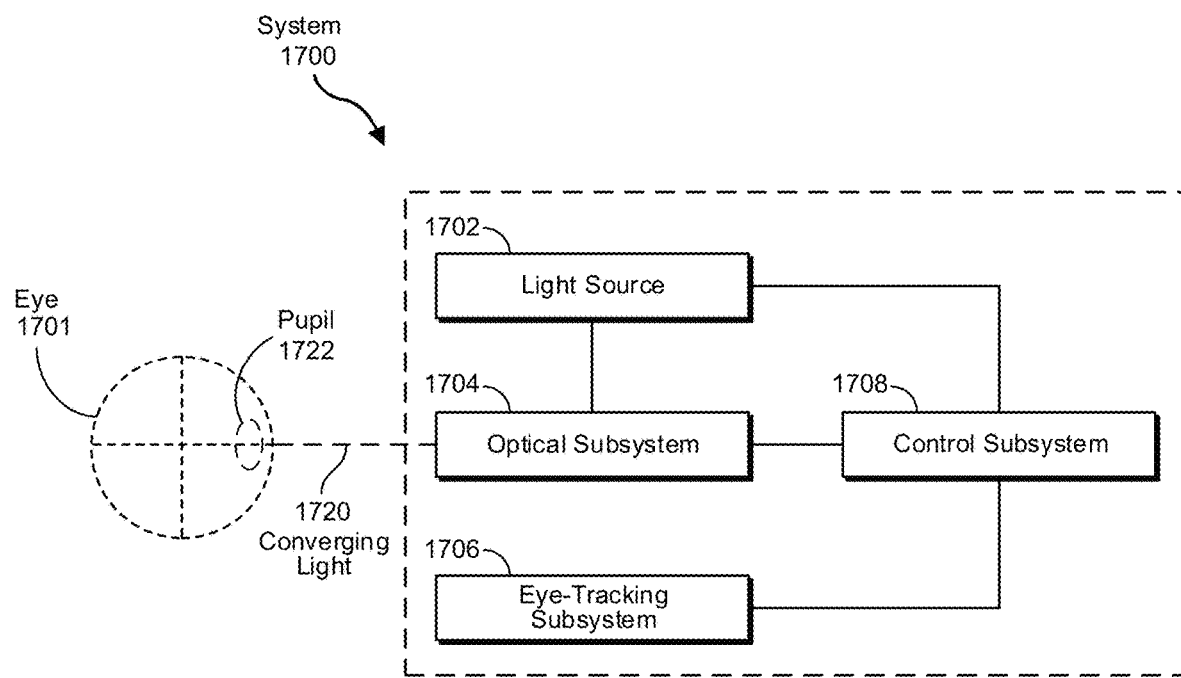
FIG. 17 is an illustration of an exemplary system that incorporates an eye-tracking subsystem capable of tracking a user's eye(s).

FIG. 17 is an illustration of an exemplary system 1700 that incorporates an eye-tracking subsystem capable of tracking a user's eye(s). As depicted in FIG. 17, system 1700 may include a light source 1702, an optical subsystem 1704, an eye-tracking subsystem 1706, and/or a control subsystem 1708. In some examples, light source 1702 may generate light for an image (e.g., to be presented to an eye 1701 of the viewer). Light source 1702 may represent any of a variety of suitable devices. For example, light source 1702 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1704 may receive the light generated by light source 1702 and generate, based on the received light, converging light 1720 that includes the image. In some examples, optical subsystem 1704 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1720. Further, various mechanical couplings may serve to maintain the relative spacing and/or the orientation of the optical components in any suitable combination.

In one embodiment, eye-tracking subsystem 1706 may generate tracking information indicating a gaze angle of an eye 1701 of the viewer. In this embodiment, control subsystem 1708 may control aspects of optical subsystem 1704 (e.g., the angle of incidence of converging light 1720) based at least in part on this tracking information. Additionally, in some examples, control subsystem 1708 may store and utilize historical tracking information (e.g., a history of the tracking information over a given duration, such as the previous second or fraction thereof) to anticipate the gaze angle of eye 1701 (e.g., an angle between the visual axis and the anatomical axis of eye 1701). In some embodiments, eye-tracking subsystem 1706 may detect radiation emanating from some portion of eye 1701 (e.g., the cornea, the iris, the pupil, or the like) to determine the current gaze angle of eye 1701. In other examples, eye-tracking subsystem 1706 may employ a wavefront sensor to track the current location of the pupil.

Any number of techniques can be used to track eye 1701. Some techniques may involve illuminating eye 1701 with infrared light and measuring reflections with at least one optical sensor that is tuned to be sensitive to the infrared light. Information about how the infrared light is reflected from eye 1701 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1706 may be digitized (i.e., converted to an electronic signal). Further, the sensor may transmit a digital representation of this electronic signal to one or more processors (for example, processors associated with a device including eye-tracking subsystem 1706). Eye-tracking subsystem 1706 may include any of a variety of sensors in a variety of different configurations. For example, eye-tracking subsystem 1706 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1706 to track the movement of eye 1701. In another example, these processors may track the movements of eye 1701 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1706 may be programmed to use an output of the sensor(s) to track movement of eye 1701. In some embodiments, eye-tracking subsystem 1706 may analyze the digital representation generated by the sensors to extract eye rotation information from changes in reflections. In one embodiment, eye-tracking subsystem 1706 may use corneal reflections or glints (also known as Purkinje images) and/or the center of the eye's pupil 1722 as features to track over time.

In some embodiments, eye-tracking subsystem 1706 may use the center of the eye's pupil 1722 and infrared or near-infrared, non-collimated light to create corneal reflections. In these embodiments, eye-tracking subsystem 1706 may use the vector between the center of the eye's pupil 1722 and the corneal reflections to compute the gaze direction of eye 1701. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1706 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1701 may act as a retroreflector as the light reflects off the retina, thereby creating a bright pupil effect similar to a red-eye effect in photography. If the illumination source is offset from the optical path, then the eye's pupil 1722 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1708 may control light source 1702 and/or optical subsystem 1704 to reduce optical aberrations (e.g., chromatic aberrations and/or monochromatic aberrations) of the image that may be caused by or influenced by eye 1701. In some examples, as mentioned above, control subsystem 1708 may use the tracking information from eye-tracking subsystem 1706 to perform such control. For example, in controlling light source 1702, control subsystem 1708 may alter the light generated by light source 1702 (e.g., by way of image rendering) to modify (e.g., pre-distort) the image so that the aberration of the image caused by eye 1701 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 18:
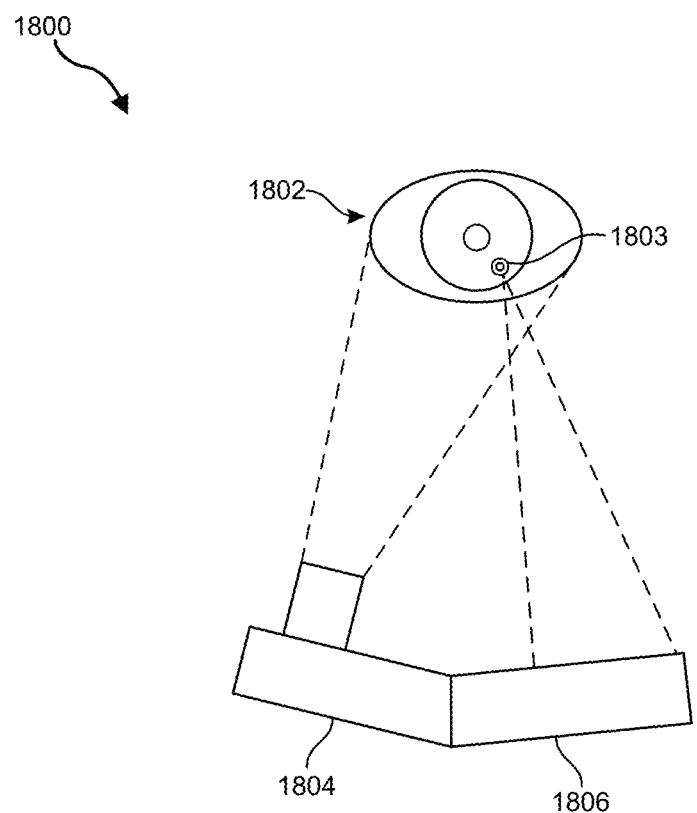
FIG. 18 is a more detailed illustration of various aspects of the eye-tracking subsystem illustrated in FIG. 17.
Figure 18:
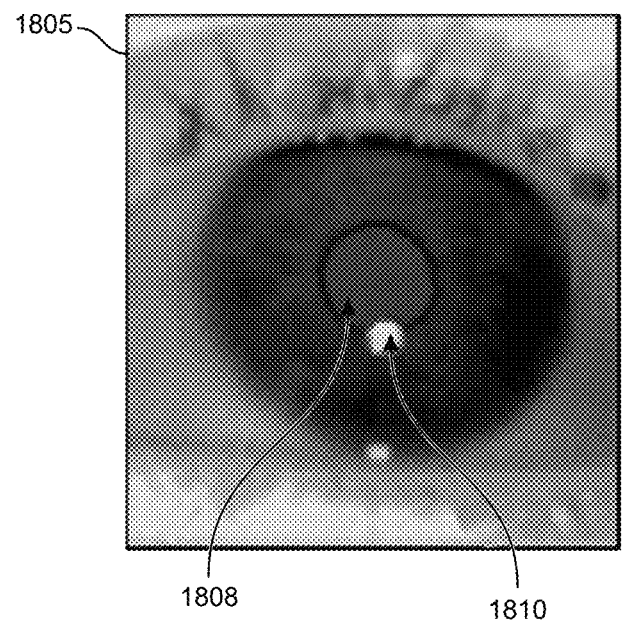

FIG. 18 is a more detailed illustration of various aspects of the eye-tracking subsystem illustrated in FIG. 17. As shown in this figure, an eye-tracking subsystem 1800 may include at least one source 1804 and at least one sensor 1806. Source 1804 generally represents any type or form of element capable of emitting radiation. In one example, source 1804 may generate visible, infrared, and/or near-infrared radiation. In some examples, source 1804 may radiate non-collimated infrared and/or near-infrared portions of the electromagnetic spectrum towards an eye 1802 of a user. Source 1804 may utilize a variety of sampling rates and speeds. For example, the disclosed systems may use sources with higher sampling rates in order to capture fixational eye movements of a user's eye 1802 and/or to correctly measure saccade dynamics of the user's eye 1802. As noted above, any type or form of eye-tracking technique may be used to track the user's eye 1802, including optical-based eye-tracking techniques, ultrasound-based eye-tracking techniques, etc.

Sensor 1806 generally represents any type or form of element capable of detecting radiation, such as radiation reflected off the user's eye 1802. Examples of sensor 1806 include, without limitation, a charge coupled device (CCD), a photodiode array, a complementary metal-oxide-semiconductor (CMOS) based sensor device, and/or the like. In one example, sensor 1806 may represent a sensor having predetermined parameters, including, but not limited to, a dynamic resolution range, linearity, and/or other characteristic selected and/or designed specifically for eye tracking.

As detailed above, eye-tracking subsystem 1800 may generate one or more glints. As detailed above, a glint 1803 may represent reflections of radiation (e.g., infrared radiation from an infrared source, such as source 1804) from the structure of the user's eye. In various embodiments, glint 1803 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 18 shows an example image 1805 captured by an eye-tracking subsystem, such as eye-tracking subsystem 1800. In this example, image 1805 may include both the user's pupil 1808 and a glint 1810 near the same. In some examples, pupil 1808 and/or glint 1810 may be identified using an artificial-intelligence-based algorithm, such as a computer-vision-based algorithm. In one embodiment, image 1805 may represent a single frame in a series of frames that may be analyzed continuously in order to track the eye 1802 of the user. Further, pupil 1808 and/or glint 1810 may be tracked over a period of time to determine a user's gaze.

In one example, eye-tracking subsystem 1800 may be configured to identify and measure the inter-pupillary distance (IPD) of a user. In some embodiments, eye-tracking subsystem 1800 may measure and/or calculate the IPD of the user while the user is wearing the artificial reality system. In these embodiments, eye-tracking subsystem 1800 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1700 and/or eye-tracking subsystem 1800 may be incorporated into augmented-reality system 1500 in FIG. 15 and/or virtual-reality system 1600 in FIG. 16 to enable these systems to perform various eye-tracking tasks (including one or more of the eye-tracking operations described herein).

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A lens system comprising:
    a lens comprising;
        a liquid crystal layer;
        a driving electrode array disposed on a first side of the liquid crystal layer, the driving electrode array comprising a plurality of driving zones, wherein:
            the plurality of driving zones each comprise a plurality of driving electrodes consecutively arranged along a radial direction extending from a central region of the lens, and
            adjacent driving electrodes in a driving zone of the plurality of driving zones are coupled to each other by a resistor;
        a floating electrode array overlapping the driving electrode array, wherein the floating electrode array is disposed between the driving electrode array and the liquid crystal layer and is separated from the driving electrode array by a dielectric layer; and
        at least one common electrode disposed on a second side of the liquid crystal layer opposite the driving electrode array; and
    a controller that is configured to independently operate each of the plurality of driving zones via a separate plurality of bus lines coupled to each of the plurality of driving zones.

2. The lens system of claim 1, further comprising an eye-tracking system configured to determine a gaze direction of a user, wherein the controller is further configured to operate at least one driving zone of the plurality of driving zones based on the gaze direction of the user.

3. The lens system of claim 1, wherein:
    each of the plurality of bus lines coupled to a driving zone of the plurality of driving zones is electrically coupled to a different driving electrode of the plurality of driving electrodes in the driving zone; and
    the controller is configured to operate the driving zone by applying a different voltage to each driving electrode electrically coupled to a bus line of the plurality of bus lines.

4. The lens system of claim 1, wherein each driving zone is electrically separated from other driving zones of the plurality of driving zones.

5. The lens system of claim 1, wherein the plurality of driving electrodes in a driving zone are electrically coupled to each other via the resistors coupling adjacent driving electrodes.

6. The lens system of claim 1, wherein a resistor coupling two adjacent driving electrodes is configured to maintain a voltage difference between the two adjacent driving electrodes during operation.

7. The lens system of claim 1, wherein the plurality of driving zones comprises at least four driving zones.

8. The lens system of claim 1, wherein the plurality of driving zones each overlap different sectors of the liquid crystal layer.

9. The lens system of claim 8, wherein the sectors overlapped by the plurality of driving zones have approximately equal sector angles.

10. The lens system of claim 1, wherein the plurality of driving zones comprises a central driving zone surrounded by a plurality of outer driving zones.

11. The lens system of claim 10, wherein the plurality of outer driving zones each extend from the central driving zone to a periphery of the driving electrode array.

12. The lens system of claim 1, wherein the plurality of driving electrodes in a driving zone each overlap an area having approximately the same size.

13. The lens system of claim 1, wherein adjacent driving electrodes are separated from each other by a gap region extending between the adjacent driving electrodes.

14. The lens system of claim 1, wherein the floating electrode array comprises a plurality of floating electrodes that overlap gap regions between adjacent driving electrodes of the driving electrode array.

15. The lens system of claim 1, wherein each of the plurality of bus lines coupled to a driving zone of the plurality of driving zones is electrically coupled to a different driving electrode of the plurality of driving electrodes in the driving zone.

16. The lens system of claim 15, wherein each of the driving electrodes electrically coupled to a bus line of the plurality of bus lines in the driving zone is located at a different radial distance relative to the central region of the lens.

17. The lens system of claim 1, wherein each of the plurality of driving electrodes in a driving zone of the plurality of driving zones extends along an arcuate path.

18. The lens system of claim 1, wherein adjacent driving zones of the plurality of driving zones are separated by a partition region that extends radially between a central region and a periphery of the driving electrode array.

19. A method comprising: operating a first driving zone of a driving electrode array of a lens via a first plurality of bus lines, wherein: the lens comprises a liquid crystal layer disposed between the driving electrode array and at least one common electrode, the first driving zone comprises a plurality of driving electrodes consecutively arranged along a radial direction extending from a central region of the lens, a floating electrode array overlapping the driving electrode array, wherein the floating electrode array is disposed between the driving electrode array and the liquid crystal layer and is separated from the driving electrode array by a dielectric layer and
    operating, independent of the first driving zone, a second driving zone of the driving electrode array via a second plurality of bus lines that is separate from the first plurality of bus lines.

20. A lens comprising:
    a liquid crystal layer;
    a driving electrode array disposed on a first side of the liquid crystal layer, the driving electrode array comprising a plurality of driving zones that are independently operable, wherein:
        the plurality of driving zones each comprise a plurality of driving electrodes consecutively arranged along a radial direction extending from a central region of the lens, and
        adjacent driving electrodes in a driving zone of the plurality of driving zones are coupled to each other by a resistor;
    a floating electrode array overlapping the driving electrode array, wherein the floating electrode array is disposed between the driving electrode array and the liquid crystal layer and is separated from the driving electrode array by a dielectric layer;

at least one common electrode disposed on a second side of the liquid crystal layer opposite the driving electrode array; and a plurality of bus lines coupled to each of the plurality of driving zones.

* * * * *